(12) United States Patent
Badding et al.

(10) Patent No.: US 11,749,836 B2
(45) Date of Patent: *Sep. 5, 2023

(54) LITHIUM-GARNET SOLID ELECTROLYTE COMPOSITE, TAPE ARTICLES, AND METHODS THEREOF

(71) Applicants: CORNING INCORPORATED, Corning, NY (US); SHANGHAI INSTITUTE OF CERAMICS, CHINESE ACADEMY OF SCIENCES, Shanghai (CN)

(72) Inventors: Michael Edward Badding, Campbell, NY (US); Yinghong Chen, Painted Post, NY (US); Xiao Huang, Shanghai (CN); Cai Liu, Suzhou-si (CN); Xinyuan Liu, Painted Post, NY (US); Yanxia Ann Lu, Painted Post, NY (US); Zhen Song, Painted Post, NY (US); Zhaoyin Wen, Shanghai (CN); Tongping Xiu, Shanghai (CN); Nathan Michael Zink, Painted Post, NY (US)

(73) Assignees: CORNING INCORPORATED, Corning, NY (US); Shanghai Institute of Ceramics, Chinese Academy of Sciences, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,281

(22) Filed: Feb. 28, 2022

(65) Prior Publication Data

US 2022/0359908 A1   Nov. 10, 2022

Related U.S. Application Data

(63) Continuation of application No. 15/953,050, filed on Apr. 13, 2018, now Pat. No. 11,296,355.

(30) Foreign Application Priority Data

Apr. 17, 2017 (CN) .................. 201710248253.4

(51) Int. Cl.
*H01M 10/0562* (2010.01)
*H01M 10/052* (2010.01)
(Continued)

(52) U.S. Cl.
CPC ......... *H01M 10/0562* (2013.01); *C04B 35/01* (2013.01); *C04B 35/481* (2013.01);
(Continued)

(58) Field of Classification Search
None
See application file for complete search history.

(56) References Cited

U.S. PATENT DOCUMENTS

| 8,658,317 B2 | 2/2014 | Weppner et al. |
| 8,986,895 B2 | 3/2015 | Ohta et al. |

(Continued)

FOREIGN PATENT DOCUMENTS

| CN | 103531840 A | 1/2014 |
| CN | 104159869 A | 11/2014 |

(Continued)

OTHER PUBLICATIONS

A. Dumon, et al., High Li ion conductivity in Strontium doped Li7La3Zr2O12 garnet. Solid State Ionics, 243 (2013) 36.
(Continued)

*Primary Examiner* — Jonathan Crepeau

(57) ABSTRACT

A composite ceramic including: a lithium garnet major phase; and a grain growth inhibitor minor phase, as defined herein. Also disclosed is a method of making composite
(Continued)

ceramic, pellets and tapes thereof, a solid electrolyte, and an electrochemical device including the solid electrolyte, as defined herein.

14 Claims, 11 Drawing Sheets

(51) Int. Cl.

| | |
|---|---|
| C04B 35/486 | (2006.01) |
| C04B 35/495 | (2006.01) |
| C04B 35/64 | (2006.01) |
| C04B 35/48 | (2006.01) |
| C04B 35/626 | (2006.01) |
| C04B 35/01 | (2006.01) |
| C04B 35/488 | (2006.01) |

(52) U.S. Cl.
CPC .......... *C04B 35/486* (2013.01); *C04B 35/488* (2013.01); *C04B 35/495* (2013.01); *C04B 35/6261* (2013.01); *C04B 35/6262* (2013.01); *C04B 35/62605* (2013.01); *C04B 35/64* (2013.01); *H01M 10/052* (2013.01); *C04B 2235/3203* (2013.01); *C04B 2235/3206* (2013.01); *C04B 2235/3208* (2013.01); *C04B 2235/3217* (2013.01); *C04B 2235/3225* (2013.01); *C04B 2235/3227* (2013.01); *C04B 2235/3244* (2013.01); *C04B 2235/5436* (2013.01); *C04B 2235/602* (2013.01); *C04B 2235/6025* (2013.01); *C04B 2235/764* (2013.01); *C04B 2235/77* (2013.01); *C04B 2235/786* (2013.01); *C04B 2235/79* (2013.01); *C04B 2235/85* (2013.01); *C04B 2235/96* (2013.01)

(56) References Cited

U.S. PATENT DOCUMENTS

| | | | |
|---|---|---|---|
| 11,296,355 B2 * | 4/2022 | Badding | H01M 10/0562 |
| 2010/0047696 A1 | 2/2010 | Yoshida et al. | |
| 2010/0047698 A1 | 2/2010 | Lin et al. | |
| 2010/0203383 A1 | 8/2010 | Weppner | |
| 2011/0053002 A1 | 3/2011 | Yamamura et al. | |
| 2011/0318650 A1 * | 12/2011 | Zhang | H01M 10/0562 |
| | | | 252/62.2 |
| 2012/0276457 A1 | 11/2012 | Hirose et al. | |
| 2013/0084505 A1 | 4/2013 | Iriyama et al. | |
| 2013/0230778 A1 | 9/2013 | Saimen et al. | |
| 2014/0011100 A1 | 1/2014 | Lee et al. | |
| 2014/0287305 A1 | 9/2014 | Wachsman et al. | |
| 2015/0099188 A1 | 4/2015 | Holme et al. | |
| 2015/0130115 A1 | 5/2015 | Sung et al. | |
| 2016/0093915 A1 | 3/2016 | Yamamoto et al. | |
| 2016/0111751 A1 | 4/2016 | Badding et al. | |
| 2016/0308244 A1 | 10/2016 | Badding et al. | |
| 2017/0022112 A1 | 1/2017 | Karpenko et al. | |
| 2018/0013171 A1 | 1/2018 | Sakamoto et al. | |
| 2019/0006707 A1 | 1/2019 | Sakamoto et al. | |

FOREIGN PATENT DOCUMENTS

| | | | |
|---|---|---|---|
| CN | 105186031 A | | 12/2015 |
| CN | 106848392 | * | 6/2017 |
| JP | 2011-070939 A | | 4/2011 |
| JP | 2012-031025 A | | 2/2012 |
| JP | 2012-174659 A | | 9/2012 |
| JP | 2014-093454 A | | 5/2014 |
| JP | 2015-048280 A | | 3/2015 |
| JP | 2016-072210 A | | 5/2016 |
| WO | 2010/090301 A1 | | 8/2010 |
| WO | 2012/114193 A1 | | 8/2012 |
| WO | 2012/176808 A1 | | 12/2012 |
| WO | 2013/128759 A1 | | 9/2013 |
| WO | 2014/038521 A1 | | 3/2014 |
| WO | 2016/061015 A1 | | 4/2016 |

OTHER PUBLICATIONS

Cussen; "The Structure of Lithium Garnets: Cation Disorder and Clustering in a New Family of Fast Li+ Conductors"; Chem. Commun. (2006) pp. 412-413.

Deviannapoorani et al.; "Lithium Ion Transport Properties of High Conductive Tellurium Substituted $Li_7La_3Zr_2O_{12}$ Cubic Lithium Garnets"; Journal of Power Sources, 240 (2013) 18-25.

Dhivya et al; "Li+ Transport Properties of W Substituted $Li_7La_3Zr_2O_{12}$ Cubic Lithium Garnets"; AIP Advances 3, 082115-1-082115-21 (2013).

Dumon et al; "HIGH Li Ion Conductivity in Stronitum Doped $Li_7La_3Zr_2O_{12}$ Garnet"; Solid State Ionics 243 (2013) 36-41.

English Translation of CN201710248253.4 Office Action dated Aug. 4, 2020; 5 Pages; Chinese Patent Office.

European Patent Application No. 18725952.8, Communication Pursuant to Article 94(3) EPC, dated Oct. 26, 2021; 5 pages; European Patent Office.

Geiger et al; "Crystal Chemistry and Stability of "$Li_7La_3Zr_2O_{12}$" Garnet: a Fast Lithium-Ion Conductor", Inorg. Chem., 2011, 50, p. 1089-1097.

Gu et al. "Effects of penta- and trivalent dopants on structure and conductivity of $Li_7La_3Zr_2O_{12}$" Solid State Ionics 274, Jun. 2015. pp 100-105.

Howard et al "Effect of Ga incorporation on the structure and Li ion conductivity of $La_3Zr_2Li_7O_{12}$", Dalton Trans. 2012, 41, 12048-12053.

Huang et al; "Effect of Sintering Temperature on Structure and Ionic Conductivity of $Li_{7-X}La_3Zr_2O_{12}$-0.5X (X=0.5-0.7) Ceramics"; Solid State Ionics; 204-205 (2011) 41-45.

Huang Xiao et al. "A Li-Garnet composite ceramic electrolyte and its solid-state Li-S battery", Journal of Power Sources, vol. 382, Dec. 2017, 19 pages.

Imagawa et al; "Garnet-Type $Li_{6.75}LA_3Zr_{1.75}Nb_{0.25}O_{12}$ Synthesized by Coprecipitation Method and Its Lithium Ion Conductivity"; Solid State Ionics, 262 (2014) 609-612.

International Search Report and Written Opinion PCT/US2018/027863 dated Aug. 6, 2018.

International Search Report of the International Searching Authority; PCT/US2015/055192; dated Dec. 17, 2015; 5 Pages; European Patent Office.

J. Awaka, et al., Sythesis and structure analysis of tetragonal $Li_7La_3Zr_2O_{12}$ with the garnet-related type structure, J. Sol. State Chem., 182 (2009) 2046.

Ji et al; "Advances in Li-S Batteries"; J. Mater. Chem., 2010, 20, 9821-9826.

Jiang, Yue et al., "Investigation of Mg2+, Sc3+, and Zn2+ doping effects on densification and ionic conductivity of low-temperature sintered $Li_7La_3Zr_2O_{12}$ garnets", Solid State Ionics, 2017, vol. 300, pp. 73-77, ISSN:0167-2738, DOI:10.1016/j.ssi.2016.12.005GU.

Jin et al; "Al-Doped $Li_7La_3Zr_2O_{12}$ Synthesized by a Polymerized Complex Method"; Journal of Power Sources, 196 (2011) 8683-8687.

Kihira Yet al. "Effect of simultaneous substitution of alkali earth metals and Nb in $Li_7La_3Zr_2O_{12}$ on lithium-ion conductivity", ECS Electrochemistry Letters 2(7), Jan. 2013, pp. A56-A59.

Knudsen; "Dependence of Mechanical Strength of Brittle Polycrystalline Specimens on Porosity and Grain Size"; Journal of the American Ceramic Society, Aug. 1959; pp. 376-387.

Kokal et al; "Sol-Gel Synthesis and Lithium Ion Conductivity of $Li_7La_3Zr_2O_{12}$ With Garnet-Related Type Structure"; Solid State Ionics, 185 (2011) 42-46.

Kotobuki et al; "Compatibility of $Li_7La_3Zr_2O_{12}$ Solid Electrolyte to All-Solid-State Battery Using Li Metal Anode"; Journal of the Electrochemical Society, 157 (10) pp. A1076-A1079 (2010).

(56) References Cited

OTHER PUBLICATIONS

Kotobuki et al; "Fabrication of All-Solid-State Lithium Battery With Lithium Metal Anode Using Al2O3-Added Li7La3Zr2O12 Solid Electrolyte"; Journal of Power Sources; 196 (2011) 7750-7754.

Lange et al; "Hindrance of Grain Growth in Al2O3 By ZrO2 Inclusions"; (1984), Journal of the American Ceramic Society, 67 (3), pp. 164-168.

Leo et al; "Lithium Conducting Glass Ceramic With Nasicon Structure"; Materials Research Bulletin, 37, (2002) pp. 1419-1430.

Li Yutao et al., "Optimizing u+ conductivity in a garnet framework", Journal of Materials Chemistry, vol. 22, No. 30, Jun. 2012, 5 pages.

Matsui et al; "Phase Transformation of the Garnet Structured Lithium Ion Conductor: Li7La3Zr2O12"; Solid State Ionics; 2013; http://dx.doi.org/10.1016/j.ssi.2013.09.027.

Murugan et al; "Fast Lithium Ion Conduction in Garnet-Type Li7La3Zr2O12"; Angew. Chem. Int. Ed. 2007, 46(41): 7778-7781.

Murugan et al; "High Conductive Yttrium Doped Li7La3Zr2O12 Cubic Lithium Garnet"; Electrochemisty Communications, 13 (2011), 1373-1375.

Ni et al; "Room Temperature Elastic Moduli and Vickers Hardness of Hot-Pressed LLZO Cubic Garnet"; J. Mater. Sci., (2012) 47: 7978-7985.

Ohta et al; "All-Solid-State Lithium Ion Battery Using Garnet-Type Oxide and Li3BO3 Solid Electrolytes Fabricated by Screen-Printing"; Journal of Power Sources, 238 (2013) pp. 53-56.

Ohta et al; "Co-Sinterable Lithium Garnet-Type Oxide Electrolyte With Cathode for All-Solid-State Lithium Ion Battery"; Journal of Power Sources, 265 (2014) pp. 40-44.

Ohta et al; "Electrochemical Performance of an All-Solid-State Lithium Ion Battery With Garnet-Type Oxide Electrolyte"; Journal of Power Sources, 202 (2012) 332-335.

Ohta et al; "High Lithium Ionic Conductivity in the Garnet-Type Oxide Li7-X La3(Zr2-X, NbX)O12 (X=0-2)"; Journal of Power Sources, 196 (2011) 3342-3345.

Peng et al., "Low Temperature Synthesis of Li3La3Nb2O12 With Cubic Garnet-Type Structure by Sol-Gel Process," J. Sol-Gel Sci. Tech. 66 (2013) 175-179.

Ramakumar et al; "Structure and Li+ Dynamics of Sb-Doped Li7La3Zr2O12 Fast Lithium Ion Conductors"; Phys. Chem. Chem. Phys., 2013, 15, 11327-11338.

Rangasamy et al; "the Role of Al AND Li Concentration on the Formation of Cubic Garnet Solid Electrolyte of Nominal Composition Li7La3Zr2O12"; Solid State Ionics, 206 (2012) 28-32.

Rettenwander et al; "a Synthesis and Crystal Chemical Study of the Fast Ion Conductor Li7-3XGaXLa3 Zr2O12 With X—0.08 to 0.84"; Inorg. Chem. 2014, 53, 6264-6269.

Saranya et al; "Li7-XLa3Sn2-XNbXO12 (X=0.25-1) Cubic Lithium Garnet"; Materials Letters 77, (2012) 57-59.

Shimonishi et al; "Synthesis of Garnet-Type Li7-XLa3Zr2O12-1/2X and Its Stability in Aqueous Solutions"; Solid State Ionics, 183 (2011) pp. 48-53.

Shinawi et al; "Stabilization of Cubic Lithium-Stuffed Garnets of the Type "Li7La3Zr2O12" by Addition of Gallium"; Journal of Power Sources, 225 (2013) 13-19.

Song et al. "Roles of alkaline earth ions in garnet-type superionic conductors" Chemelectrochem 4(2) Jan. 2017, pp. 266-271.

Thangadurai et al; "Novel Fast Lithium Ion Conduction in Garnet-Type Li5La3M2O12 (M=Nb,Ta)"; J. Am. Ceram. Soc., 86 [3] (2003) pp. 437-440.

Truong et al "First total H+/Li+ ion exchange in garnet-type Li5La3Nb2)12 using organic acids and studies on the effector Li stuffing", Inorg. Chem. 2012, 51, 1222-1224. (Year 2012).

Wolfenstine et al; "Synthesis and High Li-Ion Conductivity of Ga-Stabilized Cubic Li7La3Zr2O12"; Materials Chemistry and Physics, 134 (2012) 571-575.

* cited by examiner

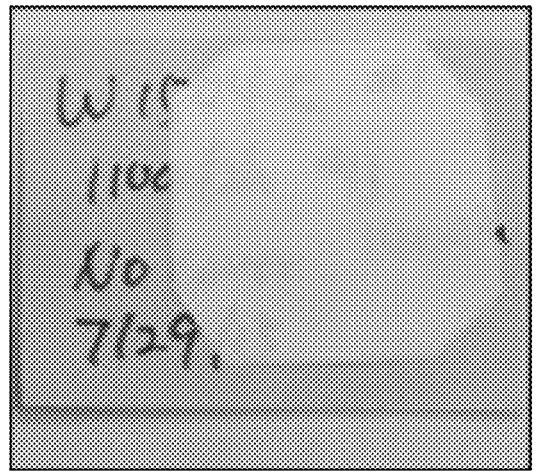
FIG. 12
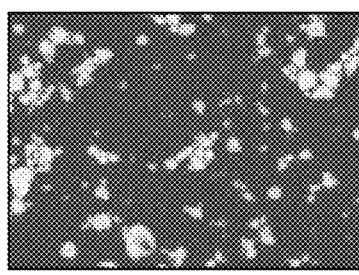 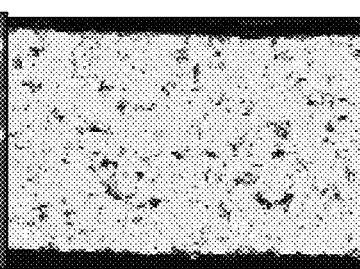 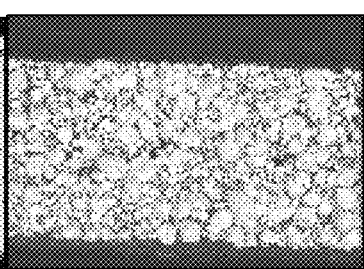
FIG. 13A      FIG. 13B      FIG. 13C

LITHIUM-GARNET SOLID ELECTROLYTE COMPOSITE, TAPE ARTICLES, AND METHODS THEREOF

CROSS-REFERENCE TO RELATED APPLICATIONS

This application is a continuation of U.S. application Ser. No. 15/953,050, filed on Apr. 13, 2018, which claims the benefit of priority to Chinese Patent Application No. 201710248253.4, filed on Apr. 17, 2017, the contents of which are relied upon and incorporated herein by reference in their entireties as if fully set forth below.

BACKGROUND

The disclosure relates generally to lithium ion solid electrolyte ceramic compositions, and more particularly to the Li-garnet oxides, and to methods of making the lithium ion solid electrolyte ceramic compositions.

SUMMARY

In embodiments, the disclosure provides a composite Li-garnet ceramic electrolyte of the formula $Li_{7-x}La_3(Zr_{2-x},M_x)O_{12}$-SA, where M is, for example, Al, Ga, In, Si, Ge, Sn, Sb, Bi, Sc, Y, Ti, Hf, V, Nb, Ta, W, or a mixture thereof; "SA" refers to a second additive (SA) oxide selected from the group MgO, CaO, $ZrO_2$, $HfO_2$, or mixtures thereof, present in a specified wt % or mol % based on the total amount of the ceramic; and x is greater than 0 and less than 1 (i.e., 0<x<1). Exemplary Li-garnet composite oxide ceramics contain the second additive, for example, in an amount of up to 9 wt % such as from 1 to 9 wt % based on the total weight of the composite.

The second additive is stable in combination with the cubic Li-garnet oxides, and can exist as an individual or discrete minor phase during the formation process. However, the elements of the second additive can also be a component in the garnet oxides. Although not limited by theory, the second additive is believed to enhance the mechanical properties of the composite by improving the uniformity of the microstructure and decreasing the grain size of the garnet oxide major phase. Although not bound by theory, the second additive is believed to restrain abnormal grain growth in the ceramic.

In embodiments, the disclosed Li-garnet composite ceramic can be useful as an electrolyte in, for example, an energy storage article.

In embodiments, the disclosure provides a method of forming a Li-garnet composite electrolyte comprising: forming a mixture of a cubic Li-garnet oxide and a second additive by a wet-milling process; preheating the mixture at a low calcination temperature; milling the mixture by a dry-milling process; compacting the mixture; and sintering the compact at a sintering temperature, wherein the resulting composite Li-garnet oxide contains the second additive in an amount up to 9 wt. % such as from 1 to 9 wt % based on the total weight of the composite.

BRIEF DESCRIPTION OF THE DRAWINGS

In embodiments of the disclosure:

FIG. 12 shows an image of an exemplary disclosed translucent or semi-transparent tape after sintering in air.

FIGS. 13A to 13C, respectively, show selected microstructural aspects of lithium garnet tapes: surface of tape (13A); polished surface (13B); and fracture surface (13C).

DETAILED DESCRIPTION

Figure 1:
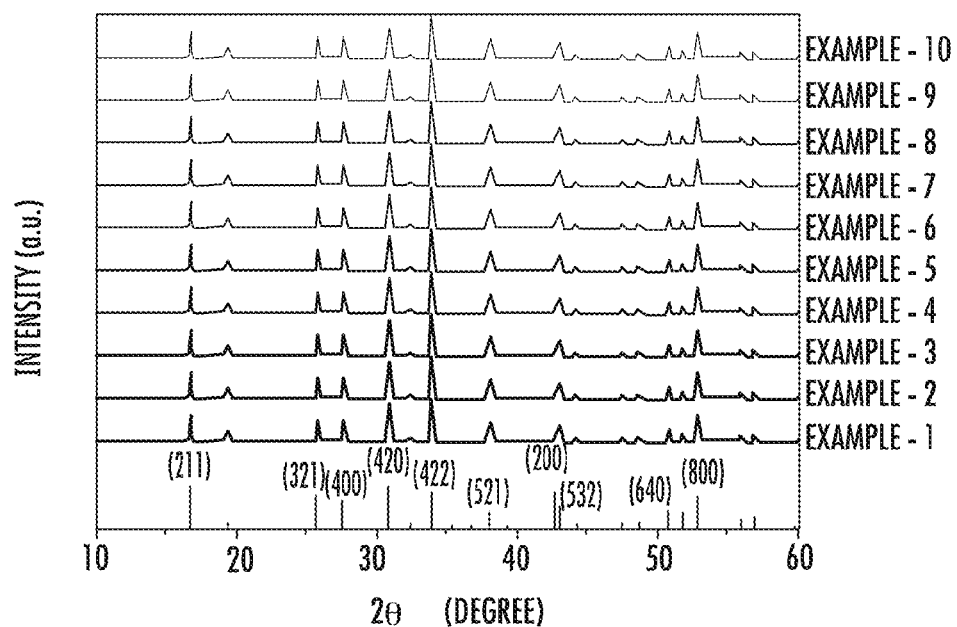
FIG. 1 is a graph showing XRD patterns of Control Example 1 and Examples 2 to 10.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed method of making and using provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

Definitions

"Major phase" or like terms or phrases refer to a physical presence of a lithium garnet in greater than 50% by weight, by volume, by mols, or like measures in the composition.

"Minor phase" or like terms or phrases refer to a physical presence of a grain growth inhibitor in less than 50% by weight, by volume, by mols, or like measures in the composition.

"SA," "second additive," "second phase additive," "second phase additive oxide," "phase additive oxide," "additive oxide," "additive," or like terms refer to an additive oxide that produces a minor phase or second minor phase within the major phase (i.e., the first phase) when included in the disclosed compositions.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The compositions, articles, and methods of the disclosure can include any value or any combination of the values, specific values, more specific values, and preferred values described herein, including explicit or implicit intermediate values and ranges.

High energy density lithium ion batteries (LIBs) are promising electrochemical energy storage devices. LIBs play a significant role in the development of portable electronic devices, electric vehicles, and load-leveling applications. Compared to conventional commercial LIBs, new LIB systems such as Li-air and Li—S batteries (see Ji X, et al., Advances in Li—S batteries, *Journal of Materials Chemistry*, 2010, 20(44): 9821-9826.) are under development for the next-generation batteries to provide higher energy density and reduce cost. In aqueous Li-Air batteries, the configuration involves a solid electrolyte membrane to separate the lithium anode from the air catholyte. For Li—S batteries, an internal "shuttle" phenomenon caused by the solubility of the long chain polysulfide in the organic electrolyte can decrease the activity mass utilization and reduce the columbic efficiency. Novel configurations that use a solid electrolyte membrane might be able to solve these problems and significantly prolong cycling without capacity fading. An all-solid-state lithium secondary battery that uses a solid electrolyte membrane may also be a future candidate for its improved safety. In the configurations of various applications, the solid electrolyte functions as the lithium ion conductor, the separating layer, the protector, and the underlay. Significant to development of the above projected new-generation batteries is a solid electrolyte membrane having excellent high relative density, high ionic conductivity, good chemical stability, and good mechanical properties. A significant challenge in the formation of such membranes via traditional ceramic routes is the inability to sinter suitable starting materials to a sufficient strength to form a membrane while producing the requisite conductivity and economy.

Recently, a novel class of lithium-stuffed garnet oxides has shown promising performance as solid electrolytes due to high ionic conductivity, chemical stability vs. lithium metal and a wide electrochemical window (see Murugan, R., et al., Fast lithium ion conduction in garnet-type $Li_7La_3Zr_2O_{12}$, *Angewandte Chemie-International Edition*, 2007, 46(41): 7778-7781). A number of elements such as Al, Ga, Y, Si, Ge, Nb, Ta, and Te have been doped into garnet to further improve the ionic conductivity by stabilizing the garnet cubic structure and much progress has been achieved. For example, the Ta-doped $Li_7La_3Zr_2O_{12}$ (LLZO) displays a favorable lithium ionic conductivity of $8\times10^{-4}$ S/cm, which is significantly higher than the undoped LLZO (see Li, Y. T., et al., Optimizing $Li^+$ conductivity in a garnet framework, *Journal of Materials Chemistry*, 2012, 22(30): 15357-15361). At the same time, design and fabrication of the all solid-state lithium batteries is being explored with garnet-type electrolytes (see Ohta, S., et al., Electrochemical performance of an all-solid-state lithium ion battery with garnet-type oxide electrolyte, *Journal of Power Sources*, 2012, 202: 332-335; Kotobuki, M, et al., Compatibility of $Li_7La_3Zr_2O_{12}$ Solid Electrolyte to All-Solid-State Battery Using Li Metal Anode, *Journal of the Electrochemical Society*, 2010, 157(10): A1076-A1079; Ohta, S., et al., All-solid-state lithium ion battery using garnet-type oxide and $Li_3BO_3$ solid electrolytes fabricated by screen-printing, *Journal of Power Sources*, 2013, 238(0): 53-56; Ohta, S., et al., Co-sinterable lithium garnet-type oxide electrolyte with cathode for all-solid-state lithium ion battery, *Journal of Power Sources*, 2014, 265: 40-44). Cubic Li-garnet oxides have shown promise as membrane materials in novel LIBs. However, it has not been possible for the garnet oxides to meet the requisite conductivity and mechanical strength required for practical application.

In the field of ceramics it is generally recognized that the strength of brittle polycrystalline materials can be affected by factors such as porosity and grain size (see Knudsen, F., Dependence of mechanical strength of brittle polycrystalline specimens on porosity and grain size, *Journal of the American Ceramic Society*, 1959, 42(8): 376-387). Abnormal grain growth can significantly decrease the mechanical properties. One approach to reducing or limiting grain growth is to add a compatible second phase which can pin grain boundaries (see Lange, F. F., et al., Hindrance of Grain Growth In $Al_2O_3$ by $ZrO_2$ Inclusions (1984), *Journal of the American Ceramic Society*, 67 (3), pp. 164-168). But in the garnet-type electrolytes, such an approach has not been implemented. Furukawa has added a 0.05 to 1 wt. % of an Al additive and 0.05 to 1 wt. % of a Mg additive to restrain the growth of garnet grains (see Furukawa, M., Solid electrolyte ceramic material and production method therefor, WO2013128759). The addition of a Mg containing additive can be accomplished by a Mg containing powder or a Mg containing crucible. Since the addition of Mg or Al is very small, the majority of the additive that is dissolved within the garnet material and, consequently, the product is not a composite of the added oxide with Li-garnet solid electrolyte. The fracture strength of the garnet oxides mentioned in the embodiments of WO2013128759 was lower than that of the Li-garnet solid electrolyte composite ceramics of the present disclosure.

In embodiments, the disclosure provides a lithium ion solid electrolyte ceramic composition, such as a Li-garnet oxide. The solid electrolyte composition can further include one or more additives, which additive can improve the uniformity of the ceramic microstructure and can enhance the mechanical properties of the ceramic. As used herein "uniformity of the ceramic microstructure" refers to the distribution of grain sizes. The occurrence of abnormally large grains, which can have a detrimental effect on mechanical properties, can be eliminated. For example, the maximum grain size measured for a population of grains representing at least 5% of the total grains should not exceed the average grain size by more than a multiple of 20.

In embodiments, the present disclosure provides a composite ceramic comprising:
a lithium garnet major phase; and
a grain growth inhibitor minor phase,
wherein lithium garnet major phase is $Li_{6.4}La_3Zr_{1.4}Ta_{0.6}O_{12}$ and comprises between 91 to 99 wt % of the composite ceramic, and the grain growth inhibitor minor phase is MgO and comprises between 1 to 9 wt % of the composite ceramic.

In embodiments, the present disclosure provides a composite electrolyte comprising: a lithium garnet ceramic, having a lithium garnet major phase and a grain growth inhibitor minor phase, of the formula:

$$Li_{7-x}La_3(Zr_{2-x},M_x)O_{12}\text{—SA},$$

where
M is selected from the group Al, Ga, In, Si, Ge, Sn, Sb, Bi, Sc, Y, Ti, Hf, V, Nb, Ta, W, or a mixture thereof, and
"SA" comprises a second additive oxide selected from the group MgO, CaO, $ZrO_2$, $HfO_2$, or a mixture thereof, present in from 1 to 9 wt % based on the total amount of the ceramic; and x is greater than 0 and less than 1. In embodiments, the lithium garnet major phase can be, for example, $Li_{6.4}La_3Zr_{1.4}Ta_{0.6}O_{12}$ and can comprise between 91 to 99 wt % of the composite ceramic, and the grain growth inhibitor minor phase is MgO and can comprise from 1 to 9 wt % based on the total weight of the composite ceramic In embodiments, the ceramic can have an average grain size of, for example, from 3 to 7 microns.

In embodiments, the ceramic can have a mechanical strength of, for example, from 100 to 180 MPa, such as 125 to 145 MPa, including intermediate values and ranges.

In embodiments, the ceramic has an ion conductivity, for example, of from $1\times10^{-4}$ S/cm to $6\times10^{-4}$ S/cm such as $1\times10^{-4}$ S/cm to $3\times10^{-4}$ S/cm, including intermediate values and ranges, see for example Table 1.

In embodiments, the sintering can be accomplished in air at, for example, from 1000 to 1300° C. such as from 1000 to 1250° C., including intermediate values and ranges.

In embodiments, the density of the ceramic is at least 95 to 98% of a theoretical maximum density of the ceramic.

In embodiments, the present disclosure provides a ceramic electrolyte comprising at least the above mentioned composite ceramic.

The present disclosure is advantaged is several aspects, including for example:

In embodiments, the microstructure of the membrane having an added second phase (i.e., "additive") is more uniform in the distribution of the grain size compared to a similar membrane without the added second phase.

In embodiments, the grain size of the disclosed garnet electrolyte having a second additive phase is smaller compared to a similar material without the second additive.

In embodiments, the mechanical strength of the disclosed garnet electrolyte is improved having the additive as a result of the above membrane microstructure, and the above smaller grain size of the garnet electrolyte.

In embodiments, the disclosed garnet electrolytes that include a preferred second additive, no or minimal loss of conductivity is suffered compared to the same garnet without the second additive or free of the second additive.

In embodiments, the present disclosure provides a method of making the above mentioned composite ceramic, comprising:
a first mixing of inorganic source materials to form a mixture, including a lithium source compound, and other suitable inorganic source materials to make the desired garnet composition;
a first milling the mixture to reduce the particle size, as defined herein, of the precursors;
calcining the milled mixture to form a garnet oxide at from 600 to 1200° C.;
a second mixing of the first milled and calcined garnet oxide and a second additive to provide a second mixture;
a second milling of the second mixture to reduce the particle size, as defined herein, of constituents of the second mixture; and
compacting the second milled, second mixture into a compact; and
sintering the compact at from 850 to 1300° C.

In embodiments, the lithium source compound can be present, for example, in a stoichiometric excess.

In embodiments, the second additive can be, for example, MgO in from 1 to 9 wt % based on the total weight of the composite.

In embodiments, the sintering can be accomplished, for example, in air, in an inert atmosphere, or first in air then in an inert atmosphere.

In embodiments, the incorporation of certain amounts of a second additive in the composite ceramic assists in restraining or inhibiting the growth of the abnormal garnet grains during high temperature sintering, which inhibition significantly improves the microstructure uniformity of the garnet ceramics.

In embodiments, the crystal grain size of garnet electrolyte can be decreased by, for example, introducing a certain amount of the second additive.

In embodiments, the method of making the Li-garnet oxides can select the relative density of the Li-garnet oxide product, for example, the relative density can be increased by the incorporation of certain amounts of a second additive such as MgO.

In embodiments, incorporation of a certain amount of the second additive in the Li-garnet oxide can enhance the mechanical properties while maintaining a high total ion conductivity and a low activation energy (Ea) in a composite ceramic electrolyte.

The disclosed composite ceramic electrolytes comprise the garnet phase and the individual second additive phase.

The disclosed garnet-type oxides including the second additive can improve the fabrication and long-term performance in applications that rely on solid-state ionic conductors.

In embodiments, the disclosure provides a method of making a tape of the abovementioned composite electrolyte, comprising:

thoroughly mixing, wet or dry, a lithium garnet batch including oxide precursors to form a batch mixture powder;

calcining the batch mixture powder in a platinum container to form a calcined powder;

milling the calcined powder to form a milled powder;

tape casting the milled powder to form a green tape; and sintering the green tape to form the tape of the composite electrolyte.

In embodiments, the method can further comprise classifying the milled powder to a mono-modal distribution having a particle size of from 0.3 to 0.7 microns.

In embodiments, a lithium garnet membrane has been produced by a tape casting method and subsequent sintering. The aqueous slip system provides a method of making tapes of a lithium garnet powder. It is possible to stack and laminate the tapes to form a thin sheet. Sintered tape can be produced in air or in an inert atmosphere, e.g., Ar or $N_2$. In embodiments, the tape can have a thickness from 20 to 300 microns, and a high density of about 95%. The tape can be flat, translucent, and hermetic. The ion conductivity of the tape can be, for example, higher than $10^{-4}$ S/cm whether sintered in air or in an inert atmosphere.

In embodiments, the present disclosure provides a method of making a thin membrane of lithium garnet electrolyte by tape casting from an aqueous slip system.

In embodiments, a lithium garnet solid electrolyte has been produced by tape casting. The tape casted electrolyte can have, for example, a thickness of 80 to 300 microns and a planer dimension larger than, e.g., a 1 inch (2.54 cm) square or a 1 inch diameter circular shape.

In embodiments, the present disclosure provides methods of making a lithium garnet solid membrane as a solid electrolyte, including lithium garnet powder fabrication, garnet setter formation, tape casting process, non-touch cover powder placement, platinum protection, and sintering conditions.

In embodiments, the lithium garnet powder can be produced by a solid state reaction. A stoichiometric batch can be thoroughly mixed by dry mixing or wet mixing prior to calcination. The final composition has a nominal lithium garnet chemical formula $Li_{7-x}La_{3-y}Zr_{2-x}A_xB_yO_{12}$ with $A^+$, $B^+$, or both doping, which can be, for example, Al, Nb oxide, Ga oxide, Ta oxide, and like dopants. The $A^+$ or $B^+$ doping can promote the stability of lithium cubic garnet phase at low temperature or during application conditioning. The cubic garnet phase is called for to provide high ion conductivity. It is desirable for the lithium garnet powder to contain a lithium garnet cubic phase at greater than 90 wt % with an average particle size $D_{50}$ less than 1.0 micron.

In embodiments, the tape casting process begins by making an aqueous garnet slip. The aqueous slip contains DI water, water soluble organic binder, a plasticizer, and a lithium garnet powder. The solid loading and binder content in the slip can be varied for achieving a variety of high quality green tapes. After removing substantially all water, the garnet powder in the resulting dry tape is over 60 vol %. The dry tape thickness can be, for example, of from 10 to 150 microns depending on the casting equipment and conditions selected. Subsequent lamination is called for to make a desirable membrane thickness, which can be, for example, 20 to 300 microns after sintering. The lamination condition is typically accomplished, for example, at 60 to 80° C. and 1000 psi for 20 mins or longer.

In embodiments, the tape can be sintered on a particular garnet setter. The setter has two functions: first, the setter is preferably a non-reactive support; and second, the setter can compensate for lithium loss during sintering in air. Some garnet compositions may not need the second Li compensation function. However, the first function is called for to sinter a clean garnet tape as an electrolyte. In embodiments, the lithium loss can additionally or alternatively be compensated for by placing some mother powder proximate to the sintering tape. Both setter (and mother powder, if any) and samples are placed in a closed environment, for example, by covering with a platinum crucible. The closed environment is significant for preventing lithium loss during sintering in air. The sintering temperature can depend on, for example, the composition, a temperature of from 1050 to 1250° C. in air, the holding time at top temperature can vary from 2 to 6 hrs depending on the size of samples. If the sample is sintered in Ar condition (i.e., pressure-less), the sintering temperature can be reduced by, for example, 50 to 100° C. compared to the sintering temperature in air.

In embodiments, after sintering, the resulting tapes are dense, translucent, and hermetic, and the tape thickness can be, for example, from 20 to 200 microns, including intermediate values and ranges. In embodiments, the ion conductivity of the sintered tapes can be over $2.0\times10^{-4}$ S/cm.

The method of the present disclosure is advantaged is several aspects, including for example:

Process: Garnet powder can be easily achieved by solid state reaction. The cubic garnet phases can be stabilized by doping alumina, niobium oxide, gallium oxide, tantalum oxide or other elements. Garnet setters are produced by traditional ceramic forming methods, such as uni-axial press, iso-press, calendaring, or extrusion. Garnet membrane is formed by tape casting from aqueous slip system with single dried tape thickness from 10 to 150 microns. The lamination of 2 to 6 layers can be accomplished, for example, at a temperature of from 20 to 80° C. and a pressure of 1000 psi for over 20 minutes. Sintering in air can have a top temperature below 1250° C. For sintering in inert atmosphere, such as Ar or $N_2$, a mother powder may not be necessary, and the top sintering temperature can be reduced (i.e., lowered) compared to the sintering in air. The membrane thickness can be adjusted by single casting, double casting, multi-layer casting, and lamination.

In embodiments, the present disclosure provides an electrochemical device comprising: a negative electrode; a positive electrode; and an interposed solid electrolyte material, wherein the interposed solid electrolyte material comprises the abovementioned composite ceramic of and at least one grain growth inhibitor comprising magnesia in an amount of from 1 to 9 wt. % based on the total weight of the solid electrolyte.

In embodiments, the work of the present disclosure discovered that the Li-garnet oxides readily form super-size grains during the sintering process, for example, more than 100 microns in diameter in a microstructure having an average grain size of under 10 microns, which super-size grains can degrade mechanical properties of the composite ceramic.

In embodiments, the present disclosure provides an economical process for making improved ceramic microstructures and enhancing the mechanical properties of the ceramic microstructures while maintaining requisite conductivity. In embodiments, the disclosure provides a composite Li-garnet electrolyte having a second phase additive, which improves the mechanical properties of the garnet-type electrolyte.

High conductivity solid electrolytes offer new design opportunities for next generation high energy density lithium-ion batteries. Ceramic electrolytes enable independent design of anode and cathode as they provide a hermetic barrier which prevents direct contact of anode and cathode chemistries. A significant aspect for next generation batteries is to have high lithium ion conducting solid electrolytes, that are safe, non-flammable, have high thermal stability and reliability, high ion conductivity, and prevent polysulfide formation for Li—S cells. Many solid electrolytes provide either high ionic conductivity or high electrochemical stability against lithium metal, but not both, such as LAGP or LATP solid electrolytes (see C. J. Leo, et al., "Lithium conducting glass ceramic with Nasicon structure", Materials Research Bulletin, 37 (2002) 1419-1430). Lithium garnets are attractive due to their high lithium ion conduction and chemical stability in moisture and in air compared to metallic lithium, and their potential as solid electrolyte for all-solid-state rechargeable lithium batteries (see V. Thangadurai, et al., *J. Am. Ceram. Soc*, 2003, 86, p 437). Lithium-containing Garnets, such as $Li_5La_3M_2O_{12}$ (M=Ta, Nb), $Li_7La_3Zr_2O_{12}$, etc., can accommodate a greater concentration of $Li^+$ cations in the $[La_3M_2O_{12}]^{5-}$ framework, the five lithium cations can occupy any of these interstitial sites: 3 tetrahedral sites; 6 octahedral sites; and 3 trigonal prismatic sites (see E. J. Cuessen, "The structure of lithium garnet: cation disorder and clustering in a new family of fast $Li^+$ conductors.", *Chem. Commun.*, 2006, 412-413). The key points in making high ion conductive lithium garnet is to produce a cubic garnet phase that provides $Li^+$ accommodation and mobility properties. Fortunately, many researchers have found ways to make powders or pellets with cubic lithium garnet phase identified by X-ray diffraction (see R. Murugan, et al., "Fast Lithium Ion Conduction in Garnet-Type $Li_7La_3Zr_2O_{12}$", *Angew. Chem. Inst.* Ed, 2007, 46, p 7778-7781; and Geiger, C., et. al., "Crystal Chemistry and Stability of "$Li_7La_3Zr_2O_{12}$" Garnet: A Fast Lithium-ion Conductor", *Inorg. Chem.*, 2011, 50, p 1089-1097.) A thin membrane (i.e., thickness less than 0.5 mm), although experimentally difficult to make has been reported that has practical use as solid electrolyte. A thin membrane made by tape casting has also been reported (see US Patent Pub 2015/0099188, "Garnet materials for Li secondary batteries and methods of making and using Garnet materials"; and US Patent Pub 2014/0287305, entitled "Ion conducting batteries with solid state electrolyte materials").

In embodiments, the present disclosure provides a composite Li-garnet oxide ceramic. The ceramic contains the Li-garnet oxides and a second additive. The phases of the ceramic are comprised of a cubic garnet phase and a composite phase.

In embodiments, the present disclosure provides a garnet oxide in a ceramic that comprises or includes at least one of a known garnet-type oxide of the formula $Li_{6.4}La_3Zr_{1.4}Ta_{0.6}O_{12}$ and can be applicable to other garnet-type oxide groups, for example:

(i) cation substitutions of $Li_7La_3Zr_2O_{12}$ in the formula of $Li_{7-x}La_3(Zr_{2-x}M_x)O_{12}$ wherein M is, for example, Al, Ga, In, Si, Ge, Sn, Sb, Bi, Sc, Y, Ti, Hf, V, Nb, Ta, and W;

(ii) other lithium ionic conductors having a garnet-type structure; and (iii) a mixture of the garnet oxides described in (i) and (ii).

Janani describes an improvement in densification that can be achieved by adding sintering aids. Lithium phosphate, lithium borate, and lithium silicate are tested as sintering aids, all at a level of 1 wt % addition, and reports higher density and conductivity for the compositions made with sintering aids. This is different from the present disclosure in several respects. First, the present disclosure adds more material, to make a "composite" and not a mere doped garnet. At a 1 wt % addition, conventional terminology would describe the resultant material as a nearly pure garnet, and not a composite. The role of the additive is to increase density by introducing a modified liquid phase during the sintering process that either lowers the required sintering temperature or makes sintering more effective at a given temperature. More effective sintering means a higher density or less porosity in the product. Furthermore, additives used in Janani do not restrain grain growth, as does MgO in the present disclosure. It is apparent from the SEM's in the Janani article that grain size increases with the included additives, and is not decreased as was discovered in the present disclosure (see *Janani*, et al., RSC Adv., 2014, 4, 51228).

In embodiments, the disclosed garnet oxides in the ceramic can have, for example, the cubic garnet crystal structure of the Ia$\bar{3}$d space group, or a cubic garnet crystal structure mixing with a small amount such as 15%, preferably less than 10%, of a tetragonal garnet crystal structure (having the $I4_{1acd}$ space group). The total conductivity of the disclosed garnet oxides can preferably be $1\times10^{-4}$ S/cm or more.

In embodiments, the additive can include, for example, MgO, and also CaO, $ZrO_2$, $HfO_2$, and like oxides, or mixture thereof. In embodiments, the additive can include, for example, carbonates, sulfonates, nitrates, oxalates, chlorides, fluorides, hydroxides along with the other elements in the chemical formula. The resulting oxide content of the additive materials can be, for example from 1 to 9 wt %, from 1.25 to 8 wt %, from 1.5 to 7 wt %, from 1.75 to 6 wt %, from 2 to 5 wt %, from 2.25 to 4.5 wt %, from 2.5 to 4 wt %, from 2.75 to 3.5 wt %, and like amounts, including intermediate values and ranges, based on the 100 wt % total of the composite comprising the garnet phase material and the grain growth inhibiting second additive.

The second additive component can improve the microstructure uniformity of the sintered garnet electrolyte. In embodiments, the grain size distributions in the sintered garnet oxide ceramics can be, for example, decreased to less than an average of 10 microns, and the abnormal growth of the garnet grains at the high sintering temperature can be, for example, significantly restrained.

In addition, the fracture strength of the disclosed Li-garnet composite sintered electrolyte can be, for example, higher than 100 MPa (testing by the three-point bending technique, geometry: rectangle, sample size: 3×4×30 mm). A Li-garnet composite electrolyte as disclosed herein, having improved strength can facilitate, for example, the fabrication of Li—S, Li-Air, and all-solid-state lithium secondary batteries.

According to an exemplary method of making the disclosed composite garnet electrolyte, the relative density of the Li-garnet composite sintered electrolytes can be, for example, greater than 95% such as from 96 to 99%, from 97 to 98%, including intermediate values and ranges. High relative density of the electrolytes will restrain, for example, lithium dendrite formation and liquid electrolyte permeation into the Li—S, Li-Air and all-solid-state lithium secondary batteries constructed with the disclosed garnet composite electrolyte.

In embodiments, the lithium ion conductivity of the sintered electrolytes can be, for example, maintained above $1 \times 10^{-4}$ S/cm, and the activation energy ($E_a$) can be, for example, lower than 0.4 eV. The use of the Li-garnet composite electrolytes in the Li—S, Li-Air, and all-solid-state lithium secondary batteries can permit the lithium ions to be more readily conducted, which can decrease the inner resistance and increase the rate of charge and discharge. The use of the disclosed Li-garnet composite electrolytes in these batteries also broadens their working temperature ranges.

In embodiments, in an exemplary method for making the disclosed garnet oxides having at least one second additives can include, for example, the steps:

a first mixing of inorganic starting batch materials to form a mixture, including a lithium source compound, and other inorganic precursors or source materials to make the desired garnet composition, and then milling the mixture to reduce the particle size to, for example, of from 0.3 to 4.0 microns (particle sizes in one slurry after the first milling process) of the precursors;

calcining the milled mixture to form a garnet oxide, for example, at from 800 to 1200° C.;

a second mixing of the garnet oxide and a second additive to provide a second mixture, and then a second milling of the second mixture to reduce the particle size to, for example, of from 0.15 to 2.0 microns (e.g., particle sizes in one slurry after the second milling process) of constituents of the second mixture; and compacting the milled second mixture into a compact; and sintering the compact, at for example, from 1050 to 1280° C.

Each of the foregoing steps is described in further detail below.

The First Mixing Step

In the first mixing step, a stoichiometric amount of inorganic materials are mixed together, in the formula of garnet oxides and, for example, milled into fine powder. The inorganic materials can be, for example, a carbonate, a sulfonate, a nitrate, an oxalate, an hydroxide, an oxide, or mixtures thereof with the other elements in the chemical formula.

In embodiments, it may be desirable to include an excess of a lithium source material in the starting inorganic batch materials to compensate for the loss of lithium during the high temperature of from 1050 to 1280° C. (e.g., 1150° C.) sintering step. The first mixing step can be a dry milling process, or a wet milling process with an appropriate liquid (i.e., a non-solvent) that does not dissolve the inorganic materials. The mixing time, such as from several minutes to several hours, can be adjusted, for example, according to the scale or extent of the observed mixing performance. The milling can be achieved by, for example, a planetary mill, an attritor, or like mixing or milling apparatus.

The Calcining Step

In the calcining step, the mixture of inorganic material, after the mixing step, is calcined at a predetermined temperature, for example, at from 800 to 1200° C., including intermediate values and ranges, to react and form the target Li-garnet oxides. The predetermined depends on the type of the garnet oxides. The calcination time, for example, from 3 to 12 hrs (e.g., 6 hrs), can also depend upon on the relative reaction rates of the selected inorganic starting or source batch materials. In embodiments, a pre-mix of inorganic batch materials can be milled and then calcinated or calcined, as needed, in a first step.

The Second Mixing Step

The calcined Li-garnet oxide mixture and the second phase additives are mixed together and ground to form a mixture of a homogeneous composition (e.g., as determined by the MgO distribution in green ceramic pellets or bars). The second mixing step can include, for example, one or more of: a wet-milling; a dry-milling; or a combination thereof. During milling of the mixture, one can optionally heat the mixture at a low temperature of, for example, from 60 to 100° C. (e.g., 70° C.) to remove adsorbed moisture or solvents.

The Compacting Step

The homogeneous second mixture composition was pulverized simultaneously during the second mixing step and compacted to form a compact. The compact was sintered at a temperature higher than the temperature of the calcining step to get dense ceramic pellets. The compact can be formed as arbitrary shapes by any suitable method, for example, cold isotropic pressing, hot isotropic pressing, hot pressing, or by like means and instrumentalities.

The Sintering Step

During the sintering step, the compact was optionally covered by a mother powder to prevent the loss of volatile components. The sintering temperature was, for example, from 1000 to 1300° C., including intermediate values and ranges.

EXAMPLES

The following Examples demonstrate making, use, and analysis of the disclosed ceramics and methods in accordance with the above general procedures.

Comparative Example 1

Comparative Example 1 was accomplished as described in Examples 2 to 10 with the exception that the wt % MgO was 0 wt %, i.e., free of any Mg or MgO.

Examples 2 to 10

The Examples 2 to 10 demonstrate the preparation of garnet-type oxides of the formula "$Li_{6.4}La_3Ta_{0.6}Zr_{1.4}O_{12}$ wt % MgO" (see Table 1), wherein the $Mg^{2+}$ ion could not go into the lattice of LLZTO and occupy $La^{3+}$ 24c site. The garnet-type oxides were synthesized as follows: a garnet-type oxide Ta-doped $Li_7La_3Zr_2O_{12}$ was prepared via a conventional solid-state reaction method, having the formula $Li_{6.4}La_3Ta_{0.6}Zr_{1.4}O_{12}$ (LLTZO). LiOH·$H_2O$ (ACS Analytical Reagent grade; "AR"), $ZrO_2$ (AR), $La_2O_3$ (99.99%), and $Ta_2O_5$ (99.99%) following the stoichiometry ratio of the desired empirical formula were mixed together by a wet grinding process with isopropanol and zirconia balls used as the milling media, while 2 wt % excess of the lithium source compound was added to compensate for subsequent lithium evaporation at high sintering temperatures. The reaction of the mixture of reactants was accomplished by twice calcining at 950° C. for 6 hr for improving the uniformity of the synthesis powder. Finally, the synthesized powder, having from 0 to 9 wt. % added MgO, was ground again to a fine powder by a wet grinding with isopropanol and zirconia balls as the milling media. The mixture was dried at 80° C. for 16 hrs and then heated at 500° C. for 1 hr to remove absorbed moisture and solvents. The dried mixture was then dry-milled to produce a homogeneous fine powder. After the first milling step, the powder was pressed (i.e., compacted) into a rectangular bar (about 5×6×50 mm) under the pressure of 200 MPa by the cold isotropic method. Then the compact was covered by the same mother powder composition and finally sintered at 1250° C. for 10 hr in a platinum crucible. The sintered samples were polished with diamond paper. The final dimensions of the polished sample specimens were about 3×4×30 mm.

The measured properties of garnet-type oxides of Comparative Example 1 and Examples 2 to 10 were as follows:

Phase Analysis

Powder X-ray diffraction (PXDR) (Rigaku, Ultima IV, nickel-filtered Cu-Kα radiation, λ=1.542 Å) was employed to determine the phase formation of the synthesis powder or pellets at about 25° C. in the 2θ range of from 10 to 800 with a step of 0.1°/sec.

Referring to the Figures, FIG. 1 shows the XRD patterns of the sintered samples of Comparative Example 1, and Examples 2 to 10, which were synthesized via a solid-state reaction method. All the well-defined diffraction peaks can be indexed to a cubic garnet-type oxide (LLZO), with positions and relative intensities coinciding with a calculation based on the reference structure (see Geiger, C. A., supra.). A weak peak matched with crystal plane (200) of MgO cubic phase on the left shoulder of the peak was indexed to diffraction plane (532) of cubic garnet phase. Except for this peak, no other impurity was found in the XRD patterns. The intensity of the peak gradually increased with the MgO content in the garnet. But the garnet peaks did not shift after sintering with MgO even in the pattern of Example 10, indicating that MgO was stable with the garnet oxides or only a very small amount (i.e., much less than 1 wt. %, such as 0.01 to 0.1 wt. %) can get into the garnet structure.

Conductivity and Activation Energy ($E_a$)

Figure 2:
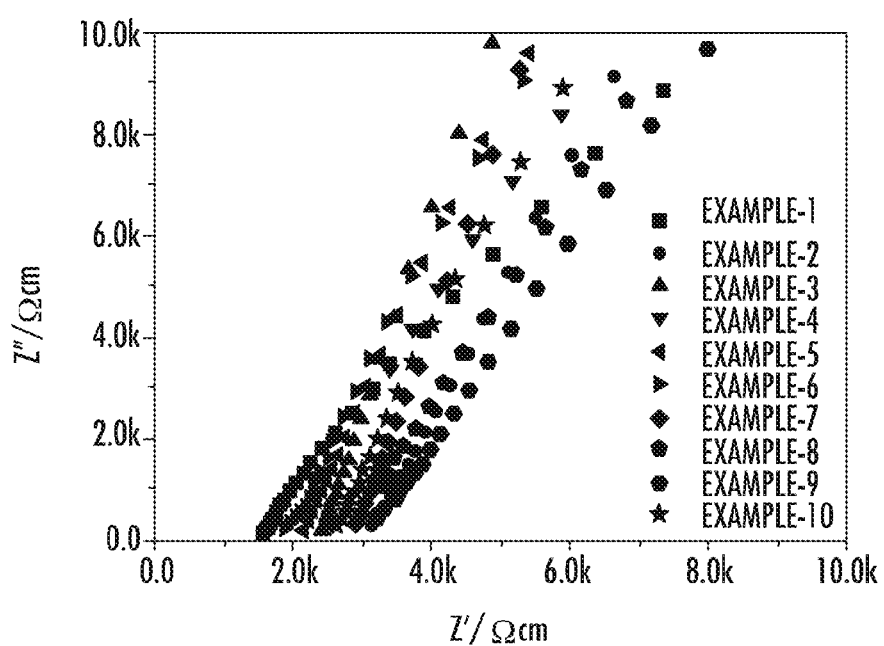
FIG. 2 is a graph showing AC impedance at room temperature corresponding to Control Example 1 and Examples 2 to 10, respectively.
Figure 4:
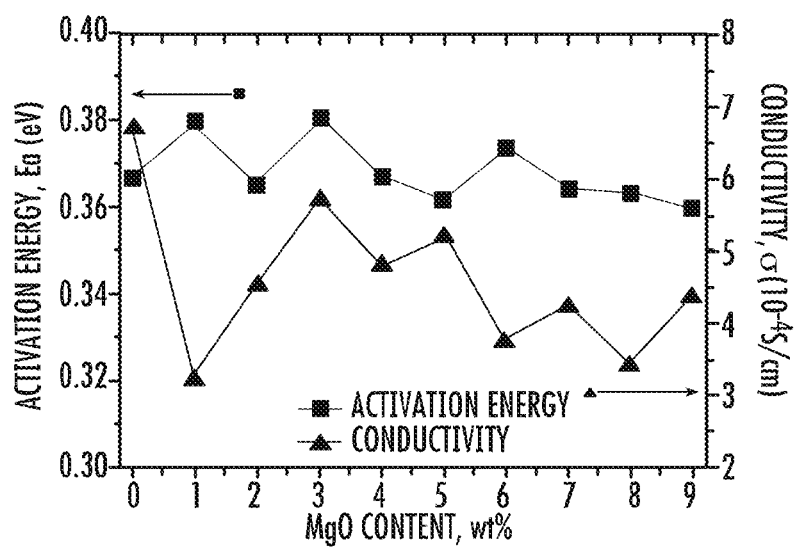
FIG. 4 is a graph showing the relationships between MgO content in weight percentage (wt %) and the total conductivity, and MgO content in weight percent and the activation energy (Ea) corresponding to Control Example 1 and Examples 2 to 10.

The ionic conductivity was measured at room temperature by the AC impedance analysis (Autolab, Model PGSTAT302N). The potentiostatic impedance model of frequency resistance analysis was selected as the test model, while the frequency ranged within 1 Hz to 1 MHz, and the electrical perturbation was set to 20 mV. Before the measurement, both the parallel surfaces were sputtered with gold as the lithium ion blocking electrode. The measurement results are shown the FIG. 2 and the relationships between the total conductivity and the MgO content is shown in FIG. 4. FIG. 2 shows AC impedance measurement at room temperature corresponding to Control Example 1 and Examples 2 to 10, respectively. The total conductivity of each of the samples of Control Example 1 and Examples 2 to 10 was more than $1\times10^{-4}$ S/cm at room temperature. The highest values corresponded to the composite samples of Examples 4 to 6 and were more than $5\times10^{-4}$ S/cm at room temperature. FIG. 4 is a graph showing the relationships between MgO content in weight percentage (wt %) and the total conductivity (lower curve and right axis), and MgO content in weight percent and the activation energy ($E_a$) (upper curve and left axis) corresponding to each of the Control Example 1 and Examples 2 to 10, respectively, and listed in Table 1.

Figure 3:
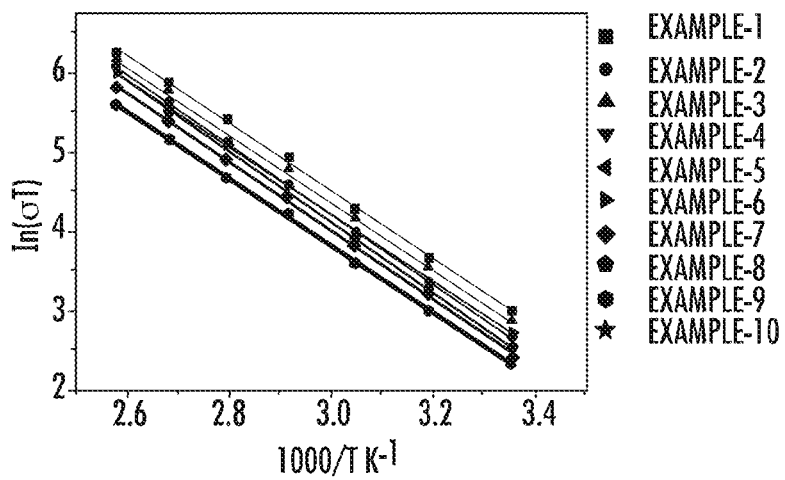
FIG. 3 is a graph showing the Arrhenius plots and fitting results corresponding to Control Example 1 and Examples 2 to 10, respectively.

The activation energy ($E_a$) was measured at from 298 to 388° K in a temperature chamber and calculated from the slope of an Arrhenius plot according to the equation:

$$\sigma T = A\exp(Ea/kT),$$

wherein σ is the conductivity, A is the frequency factor, $E_a$ is the activation energy, k is the Boltzmann constant, and T is the absolute temperature. The activation energies of Control Example 1 and Examples 2 to 10, were from 0.36 to 0.38 eV, which was obtained by the linear fitting of the Arrhenius plot shown in the FIG. 3. The relationship between the activation energy and the MgO content is shown in the FIG. 4, indicating that the second additives did not have an apparent effect on the activation energy of the Li-garnet oxides.

Relative Density

Figure 5:
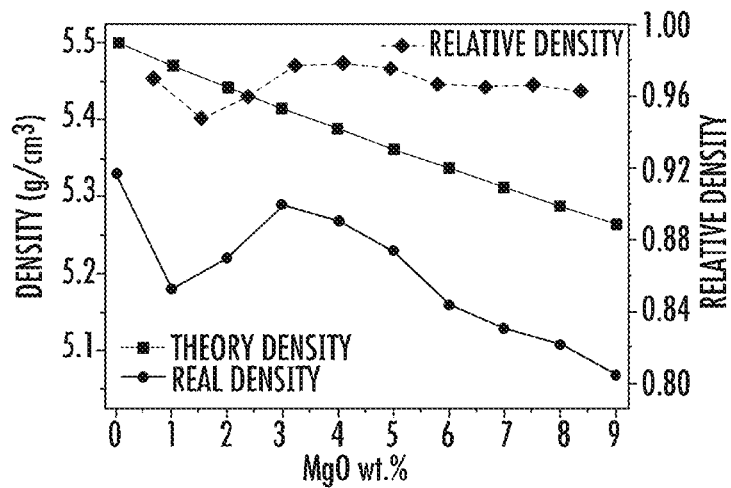
FIG. 5 is a graph showing the relationships between MgO content (in wt %) of the disclosed ceramics and the theoretical density (left axis), the practical or real density (left axis), and the relative density (right axis) in the Control Example 1 and Examples 2 to 10.

The density of the specimens was tested by the Archimedes method with the Mettler-Toledo density measurement attachments. The theoretical density was calculated from the XRD results in the FIG. 1. FIG. 1 is a graph showing XRD patterns of Control Example 1 and Examples 2 to 10. The vertical lines (e.g., 211, 321, 400, 420, 422, 521, 532, 640, 800) at the bottom represent reference data (see Geiger, C. A., infra.), and the vertical line (e.g., 200) at the bottom were MgO data from standard cards. The practical density, theoretical density, and relative density of Comparative Example 1 and Examples 2 to 10 is shown in FIG. 5. When the MgO content was more than 3 wt. %, the relative density of the sintered samples was more than 96%. FIG. 5 shows the relationships between MgO content (in wt %) of the disclosed ceramics and the theoretical density (left axis), the practical or real density (left axis), and the relative density (right axis) corresponding to Control Example 1 and Examples 2 to 10, respectively.

Fracture Strength and Vickers Hardness

Figure 6:
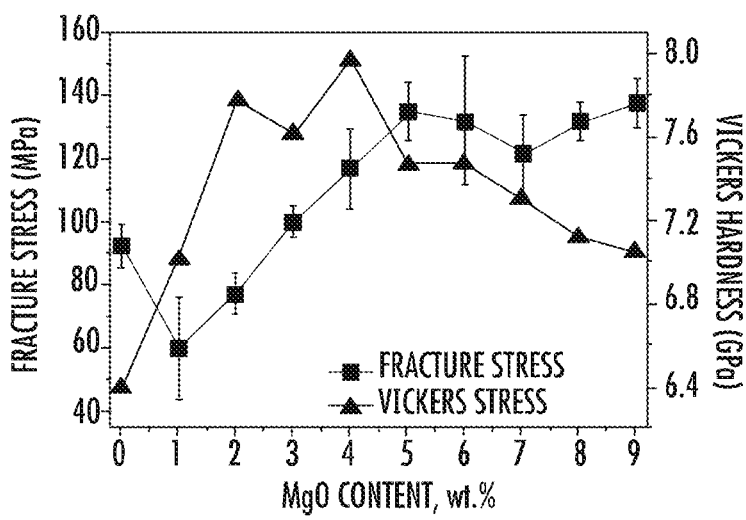
FIG. 6 is a graph showing the relationships between MgO content (in wt %) of the ceramics and the fracture stress (i.e., strength; left axis), and the Vickers hardness (right axis) corresponding to Control Example 1 and Examples 2 to 10, respectively.
Figure 7A:
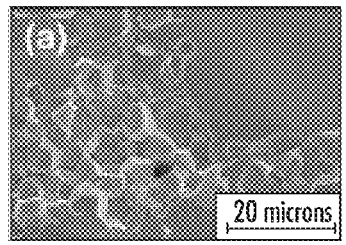
FIGS. 7A to 7J show scanning electron microscope (SEM) images of pristine sintered samples in cross-section corresponding to Control Example 1 and Examples 2 to 10, respectively.
Figure 7B:
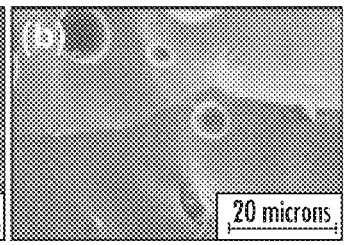
Figure 7C:
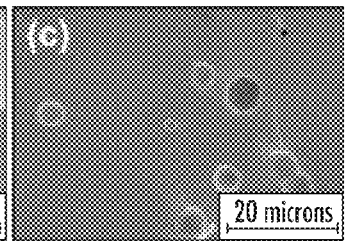
Figure 7D:
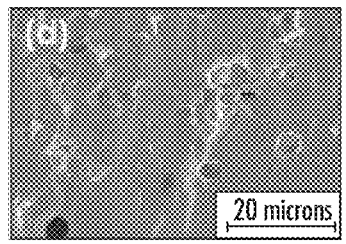
Figure 7E:
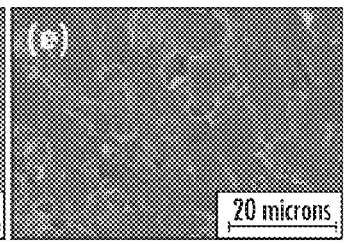
Figure 7F:
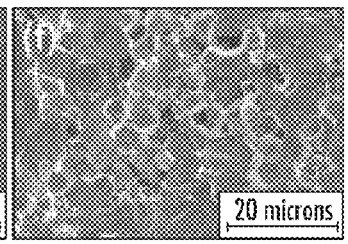
Figure 7G:
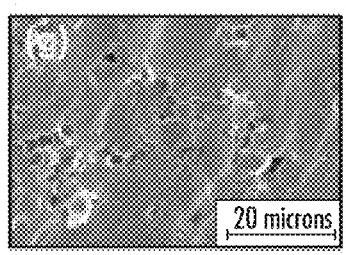
Figure 7H:
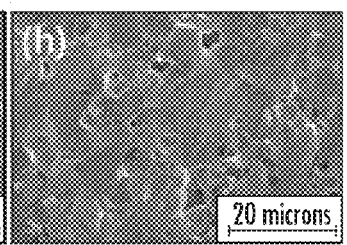
Figure 7I:
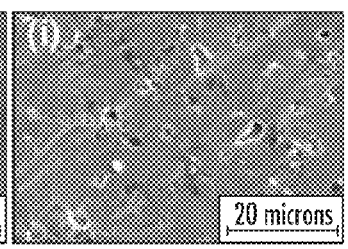
Figure 7J:
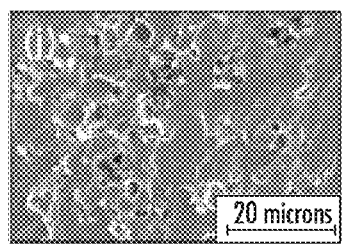
Figure 8A:
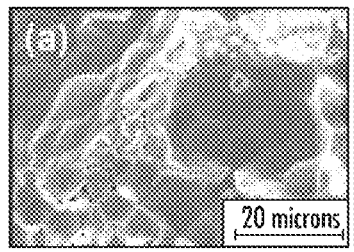
FIGS. 8A to 8J show SEM images of chemical corrosion samples in cross-section corresponding to Control Example 1 and Examples 2 to 10, respectively.
Figure 8B:
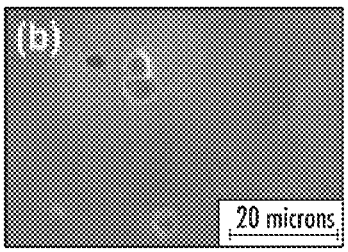
Figure 8C:
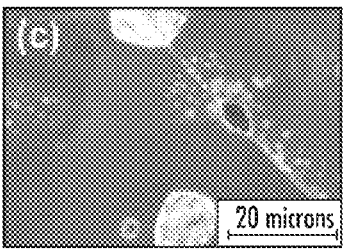
Figure 8D:
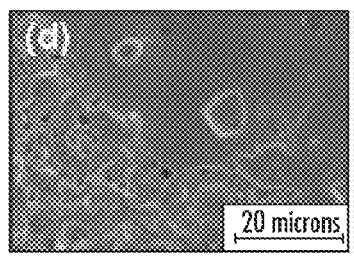
Figure 8E:
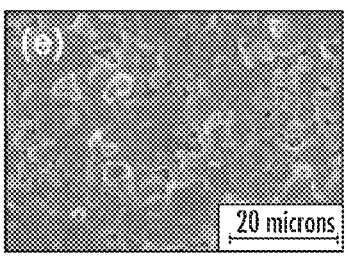
Figure 8F:
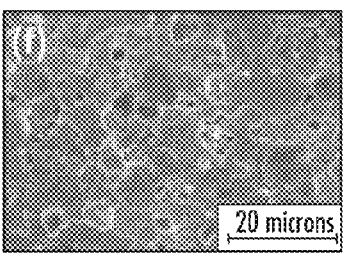
Figure 8G:
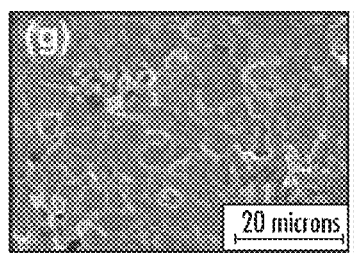
Figure 8H:
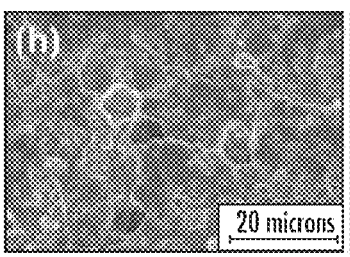
Figure 8I:
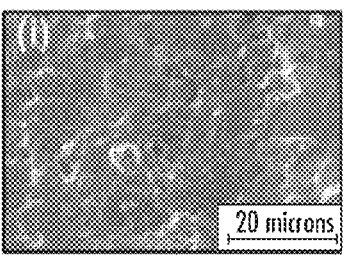
Figure 8J:
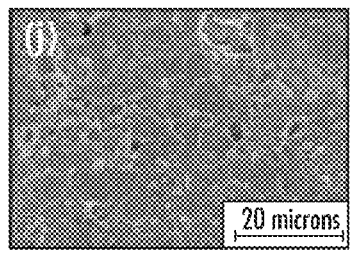
Figure 9A:
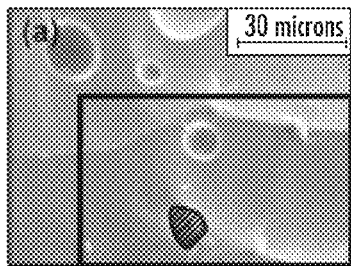
FIGS. 9A to 9I show energy dispersive spectroscopy (EDS) images of MgO distributions of pristine samples corresponding to Examples 2 to 10, respectively.
Figure 9B:
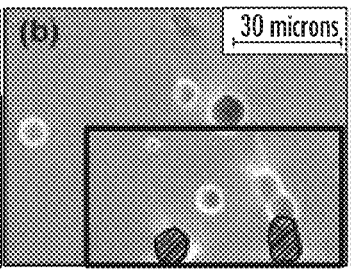
Figure 9C:
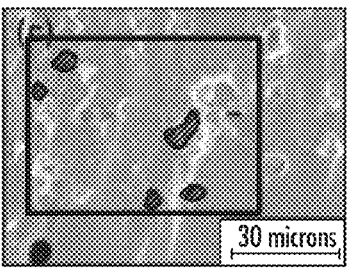
Figure 9D:
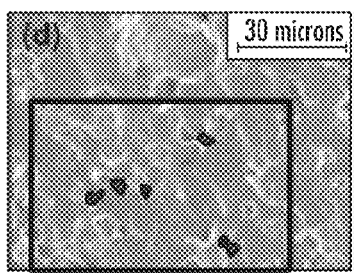
Figure 9E:
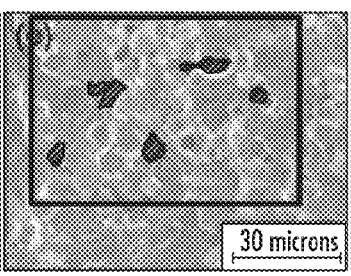
Figure 9F:
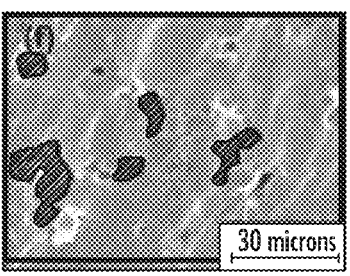
Figure 9G:
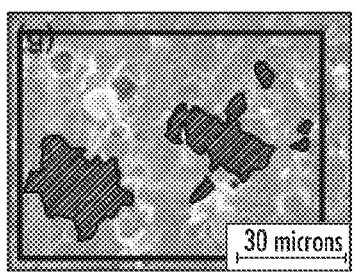
Figure 9H:
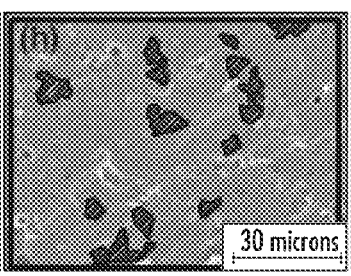
Figure 9I:
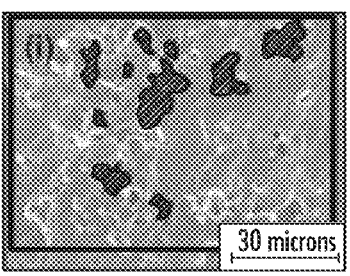
Figure 10A:
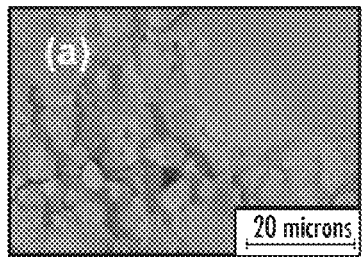
FIGS. 10A to 10J show back scattering electrons (BSE) images of pristine samples corresponding to Control Example 1 and Examples 2 to 10, respectively.
Figure 10B:
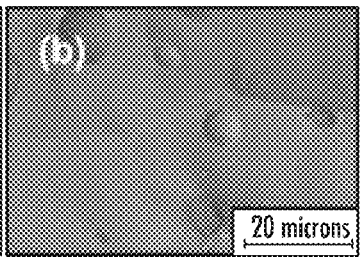
Figure 10C:
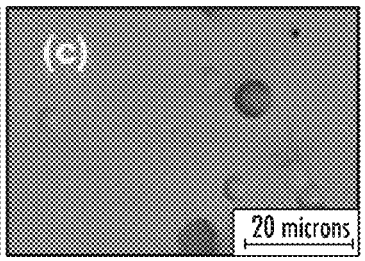
Figure 10D:
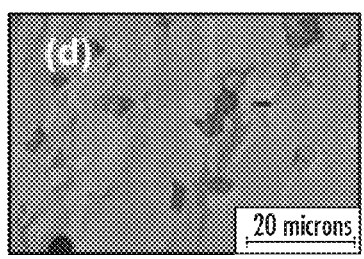
Figure 10E:
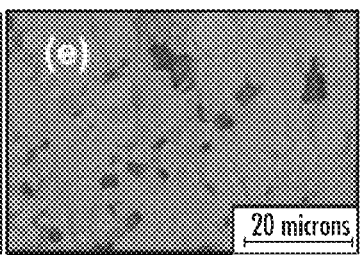
Figure 10F:
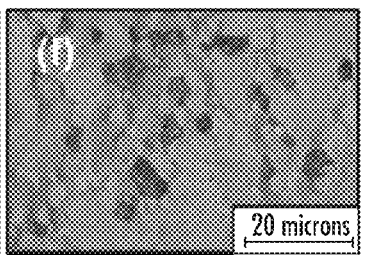
Figure 10G:
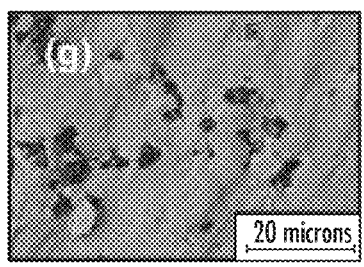
Figure 10H:
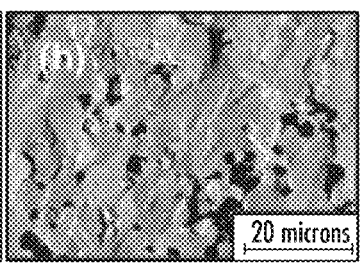
Figure 10I:
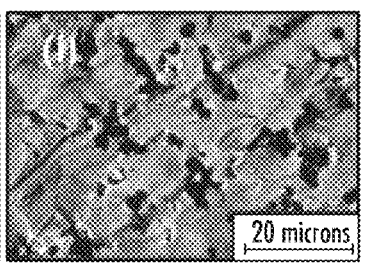
Figure 10J:
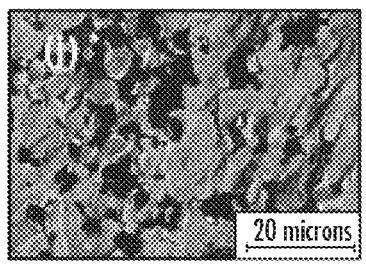

The mechanical strength of Comparative Example 1 and Examples 2 to 10 was determined by the three-point bending technique (Instron 3366). The bottom spans were 20 mm and the loading rate was 0.02 mm/min. The Vickers hardness, H, was measured with a hardness tester. The average hardness of Comparative Example 1 and Examples 2 to 10 was determined using five indentations per load on the polished surface at the loads of 4.9 N with a 5 s loading time. To avoid the interference between stress fields of the closely spaced indentations or perturbations caused by specimen edge effects, separation distances of at least 500 microns were maintained between adjacent indentation sites. The fracture strength and Vickers hardness measuring results are shown in FIG. 6. When the MgO content was more than 3%, the fracture strength was higher than the pure Li-garnet oxides.

Pristine and Chemical Corrosion Cross-Section Microstructure

The random cross-section microstructure morphologies of sintered samples of Control Example 1 and Examples 2 to 10 were revealed by the SEM (Hitachi, S-3400N). The random cross-section microstructures are shown in FIGS. 7A to 7J, respectively. These sample were chemically etched with an aqueous 6 M HCl solution for 3 min to reveal the grain boundaries and the chemical corrosion morphologies are shown in FIGS. 8A to 8J, respectively (i.e., where image: a) Control Ex 1=0 wt %, b) Ex 2=1 wt %, c) Ex 3=2 wt %, d) Ex 4=3 wt %, e) Ex 5=4 wt %, f) Ex 6=5 wt %, g) Ex 7=6 wt %, h) Ex 8=7 wt %, i) Ex 9=8 wt %, and j) Ex 10=9 wt %). When the MgO content was more than 3 wt %, the grain size of the Li-garnet oxides was significantly decreased to less than 10 microns and an appropriate dense microstructure was obtained. The overgrowth of the garnet grains was notably restrained by the addition of the MgO additive, and contrary to the reported grain size increase trend (see Janini supra.).

Distribution of the Second Additive MgO

The Mg distribution in the cross-section of Comparative Example 1 and Examples 2 to 10 was probed by scanning electron microscopy with the energy dispersive detector (Hitachi, S-3400N). The Mg element mapping scanning images and the backscatter scanning electron images of the random cross-section are shown in FIG. 9 and FIG. 10, respectively.

FIGS. 9A to 9I show energy dispersive spectroscopy (EDS) images of MgO distributions of pristine samples corresponding to Examples 2 to 10, respectively (Control Example 1 image not shown). The framed regions represent the detected area for element analysis, and the cross-hatched shaded areas (red in original color images not included) represent examples of significant (but not all) Mg rich regions. FIGS. 10A to 10J show back scattering electrons (BSE) images of pristine samples corresponding to Control Example 1 and Examples 2 to 10, respectively.

It was noted that the MgO grains were formed in all the composite ceramic electrolytes. When the MgO content was more than 3 wt %, MgO grains existed between the garnet oxides grains and restrained the growth of garnet grains. The MgO content of more than 3 wt % also allowed a very small amount of Mg into the garnet structure, which was not detected by the energy dispersive detector. Table 1 lists the SEM analysis of Comparative Example 1 and Examples 2 to 10.

The garnet structure of $Li_7La_3Zr_2O_{12}$ can possess two crystalline phases: tetragonal and cubic. The tetragonal phase is a stable phase at ambient condition, but it may undergo a phase transition to the cubic phase between 100 and 150° C. (see Geiger, C., supra.). The tetragonal garnet has space group symmetry $I4_1/acd$ and is characterized by lower ion conductivity compared to cubic garnet (see Awaka, J., et al., *J. Solid State Chem.*, 2009, 182, 2046-2052). Although the reason for the lower ion conductivity difference is not understood, the researchers were focused on making stable cubic garnet by exploring additives that would easily maximize the ion conductivity. The typical additives mentioned in the literature (see R. Murugan, et al., "Fast Lithium Ion Conduction in Garnet-Type $Li_7La_3Zr_2O_{12}$", *Angew. Chem. Inst. Ed*, 2007, 46, 7778-7781; C. Geiger, et al., "Crystal Chemistry and Stability of "$Li_7La_3Zr_2O_{12}$" Garnet: A Fast Lithium-ion Conductor", *Inorg. Chem.*, 2011, 50, 1089-1097) include, for example, $Al^{3+}$, $Nb^{5+}$, $Ta^{5+}$, $Ga^{3+}$, $Sn^{5+}$, $Sn^{3+}$, and like ions as needed to produce a cubic garnet powder or pellets (see U.S. Pat. No. 8,986,895, "Garnet type lithium ion-conducting oxides and all solid state lithium ion secondary battery conducting the same," S. Ohta, et. al.). However, there are few reports on making lithium garnet membranes by tape casting since several challenges limit this approach. First, tape casting involves solvents and binders, which can lower the compaction of green body. Second, tape casting is a pressure-less forming method, and the green density is lower than pressure forming methods that most prior work has reported. Third, the lithium garnet membrane is extremely thin, so it is not practical to cover the tape by mother powder as most researchers have done for thicker pellets. Fourth, the lithium garnet or its precursors are chemically reactive and can readily react with other materials, so it is challenging to identify suitable setter materials. To overcome the above

TABLE 1

Summary of SEM Analysis of Control Example 1 and Examples 2 to 10.

| Example No. | Composition $Li_{6.4}La_3Ta_{0.6}Zr_{1.4}O_{12}$ + wt % (mol %) MgO additive (vs. LLZTO) | Conductivity ($10^{-4}$ S/cm) | Activation energy (eV) | Relative density | Fracture strength (MPa) | Vickers hardness (GPa) |
|---|---|---|---|---|---|---|
| 1 (Control) | 0 wt % (0 mol %) | 6.7 | 0.366 | 97% | 92.5 | 6.38 |
| 2 | 1% (22%) | 3.2 | 0.380 | 95% | 60.4 | 7.00 |
| 3 | 2% (44%) | 4.5 | 0.365 | 96% | 77.2 | 7.77 |
| 4 | 3% (66%) | 5.7 | 0.381 | 98% | 100 | 7.61 |
| 5 | 4% (88%) | 4.8 | 0.367 | 98% | 117 | 7.96 |
| 6 | 5% (110%) | 5.2 | 0.362 | 98% | 135 | 7.46 |
| 7 | 6% (132%) | 3.75 | 0.373 | 97% | 132 | 7.47 |
| 8 | 7% (154%) | 4.25 | 0.364 | 97% | 122 | 7.30 |
| 9 | 8% (176%) | 3.41 | 0.363 | 97% | 132 | 7.11 |
| 10 | 9% (198%) | 4.36 | 0.360 | 96% | 138 | 7.04 |

Lithium garnet has garnet-like structure and predominantly ionic conduction (see Cuessen, E. J., "The structure of lithium garnet: cation disorder and clustering in a new family of fast $Li^+$ conductors", *Chem. Commun.*, 2006, p 412-413) with a nominal chemical composition $Li_7La_3Zr_2O_{12}$. This composition is reported to have high lithium ion conductivity, and good thermal and chemical stability against reactions with a lithium metal electrode. The composition is easy to prepare from low cost materials and is readily densified at low temperatures around 1200° C. These features suggest that zirconia-containing lithium garnet is a promising candidate for a solid electrolyte for lithium battery.

challenges, new compositions and improved processes have been developed and are presently disclosed.

In embodiments, the disclosure provides a method of making lithium garnet that begins with a garnet powder fabrication. A batch including oxide precursors is thoroughly mixed. The final composition after calcination has a formula: $Li_{7-x}La_{3-y}Zr_{2-x}A_xB_yO_{12}$. To ensure homogeneity, the starting batch powder can be dry-mixed by Turbula® Shaker mixing, for example, for at least 30 minutes, vibratory mixing at least 30 min, and ball milling over 2 hr. Wet mixing is recommended but not required. The wet mixing can be conducted in, e.g., water or isopropyl alcohol with a vibratory mixer for 2 hrs to break down the agglomerates, then ball-milled on a roller for 1 to 2 hrs, then dried at 100°

Figure 11A:
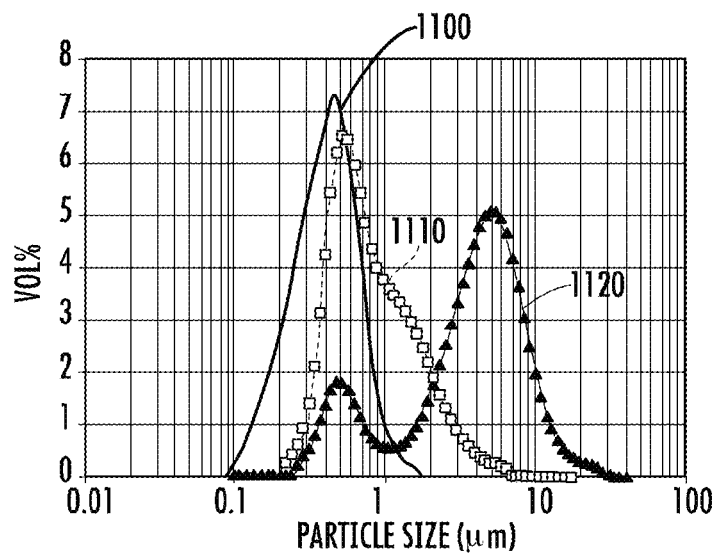
FIGS. 11A and 11B, respectively, show particle size distributions by vol % for a Ga—Nb doped garnet composition of the formula $Li_{6.75}La_{2.8}Ga_{0.2}Zr_{1.75}Nb_{0.25}O_{12}$ ("HF 110"), and for a Ta-doped garnet composition of the formula $Li_{6.5}La_3Zr_{1.5}Ta_{0.5}O_{12}$ ("HQ 110").
Figure 11B:
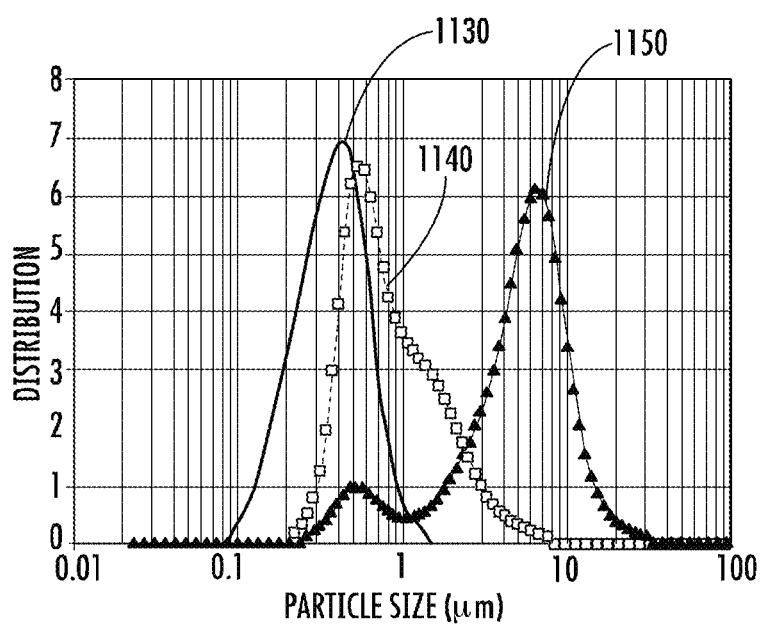

C. for 1 to 2 days. The dried and mixed powder was calcined in a platinum container covered by an alumina sheet at, for example, from 1000 to 1250° C. for 2 to 12 hrs. The optimal calcination temperature will depend on the particular garnet composition selected. After calcination, the powder was milled by either ball milling or jet milling with 90 wt. % of the above lithium garnet cubic phase. The ball milled powder was coarser, having particles having a D50 of from 1 to 5 microns, the jet-milled powder was finer having a D50 from 0.5 to 0.9 microns. Both the coarse and fine powders have approximately a bi-modal particle size distribution. For tape casting, a finer powder having a mono-modal distribution is preferred. A mono-modal fine powder, e.g., 3 microns, can be achieved by air classification of the ball milled powder. Three powders were produced after air classification and their particle size distributions are shown in FIGS. 11A and 11B. The ultrafine powder (e.g., 0.3 to 0.4 microns) is a preferred garnet powder for tape casting. The "−3 micron" (e.g. circa 0.7 microns) type powder is suitable for some compositions. The "+3 micron" (e.g., 4 to 5.5 microns) powder is more difficult to make as a hermetic tape. The ultrafine powders have a mono-modal distribution, which gives high green compaction after tape casting, and uniform shrinkage that ensures the flatness of green tape and sintered tape.

FIGS. 11A and 11B, respectively, show particle size distributions by vol % for a Ga—Nb doped garnet composition of the formula $Li_{6.75}La_{2.8}Ga_{0.2}Zr_{1.75}Nb_{0.25}O_{12}$ ("HF 110"), and for a Ta-doped garnet composition of the formula $Li_{6.5}La_3Zr_{1.5}Ta_{0.5}O_{12}$ ("HQ 110"). In each instance, the garnet powders were ball-milled and then air classified into three fractions: "ultrafine," "−3 microns" and "+3 microns." For HF 110 d50 of the ultrafine fraction is 0.4 microns (1110); d50 of the −3 micron fraction is 0.71 microns (1120); and d50 of the "+3 micron" fraction is 4.0 microns (1130). For HQ 110, d50 of the ultrafine fraction is 0.4 microns (1130); d50 of the −3 micron fraction is 0.7 microns (1140); and d50 of the "+3 micron" fraction is 5.3 microns.

The tape casting process includes, for example, slip making, tape casting, drying, and lamination. An aqueous slip has been formulated herein for making garnet tape. Garnet powder is reported to be more stable in acid and basic aqueous solution than LTAP (see Y. Shimonishi, et. al, "Synthesis of garnet-type $Li_{7-x}La_3Zr_2O_{12-1/2x}$ and its stability in aqueous solutions", *Solid State Ionics*, 183 (2011) 48-53). Their tests were conducted at 50° C. for one week. In the presently disclosed method, stability tests of the powder or the pellet in water also show a reaction of garnet with water at room temperature. The objective is to tape cast within relatively short time after slip preparation and prior to any substantial change of slip rheology. A typical aqueous slip composition formulation is listed in Table 2. The support was Mylar 05270, and the applicator blade had a 14 mil gap width. Table 3 shows the information of aqueous binders used in the slips. The slip making includes the steps of: dispersing the garnet powder in de-ionized water to form a garnet suspension; adding binder to the garnet suspension; high speed mixing with vacuum and chilling for 5 to 10 min; and tape casting using a 6 mil to 18 mil blade. The tape is 90 wt % dried in less than about 24 hrs (e.g., 10 wt % residual water), then it is laminated at 60 to 80° C. at 1000 psi for 20 min. The laminated tape has a thickness of from 100 to 400 microns with an area of, for example, from 1 to 3 square inches or larger.

TABLE 2

Example aqueous slip composition formulation.

| | Component | Density (g/cm³) | Slip (g) | Slip wt % | Vol (cc) | Slip vol % |
|---|---|---|---|---|---|---|
| Solvent Solution | DI Water | 1.0 | 30.000 | 56.60 | 30.000 | 73.3 |
| Garnet | Garnet powder, air classify 0.396 microns | 4.5 | 15.000 | 28.30 | 3.333 | 8.1 |
| Binder & Plasticizer | Binder for aqueous base (no plasticizer) | 1.050 | 8.00 | 15.1 | 7.619 | 18.6 |
| Total | | — | 53.000 | 100 | 40.952 | 100 |

Table 2 lists three different proprietary water based binder formulations from Polymer Innovations (Vista, Calif.) that were tested for compatibility with the disclosed garnet powders.

TABLE 3

Water based binder formulations.

| Binder Name | Water Content (wt %) | Binder Content (wt %) | Plasticizer Content (wt %) |
|---|---|---|---|
| WB4101 | 65 | 28 | 7 |
| WB40B-44 | 65 | 30 | 5 |
| WB40B-53 | 74 | 26 | 0 |

The binder can include, for example, an aqueous solution of a proprietary acrylic polymer having copolymerized polar functional groups (according to the commercial source: Polymer Innovations, see polymerinnovations.com). The acrylic polymer has a $T_g$ of approximately 40° C. but can be plasticized to a much lower $T_g$ to permit typical tough cast tape properties. The polymer is soluble in water when the pH is alkaline, and can be achieved by, for example, the addition of a small percentage (e.g., 0.1 to 3 wt %) of ammonia hydroxide.

It was determined that the WB4101 and WB40B-44 binders systems, which also contain plasticizer, adversely affected the rheology of the slurry. This resulted in flocculation and an inability to cast a suitable tape for some compositions. The WB40B-53 binder, free of added plasticizer, allowed for a slurry with high viscosity that could be cast to a thin workable tape for sample preparation, if cast immediately after mixing. In embodiments, WB40B-53 is a preferred binder for preparing the presently disclosed garnet tapes.

Sintering of laminated tape in air calls for several conditions. First, the tape is placed on a garnet setter, each garnet composition may need its own garnet setter of the same or similar composition. The setter preferably has a higher sintering temperature than the tape so that the tape does not stick to the setter during sintering. The setter is also preferably a composition that is rich in lithium, which provides additional Li for the tape if needed. Second, the mother powder is preferably the same composition as the garnet powder when the tape is placed around the setter or near the tape to compensate for the loss of Li in the tape during sintering. A mother powder may not necessary for all garnet compositions. The need for a mother powder can depend on the composition. For example, in a lithium rich composition, a mother powder is not needed. For a lithium deficient composition, the tape may need to be buried in a mother powder. A preferred Li content in the empirical formula composition can have a stoichiometry of, for example, from 6.4 to 6.8 mol equivalents (i.e., $Li_{6.4\ to\ 6.8}$). Third, a closed environment is necessary to enclose the tape, the setter, and the mother powder such as in an inverted platinum crucible firing apparatus (1400) shown in FIG. 14. The bottom support is a platinum sheet, the garnet setter is placed on top of the sheet along with the mother powder, and the platinum crucible contacts the bottom platinum sheet. At low temperature, the gap between the crucible and sheet can release evolved gas, while at high temperature (greater than 800° C.), the gap is closed because of a weight (e.g., $Al_2O_3$ (1440)) on the top of platinum crucible. Such closed system makes the sintering of garnet tape very effective. Fourth, the sintering in air is preferably accomplished in a regular kiln. A slow heating rate below 400° C. is preferred such as from 60 to 90° C./hr due to the binder burn out. Above 400° C., the heating rate can be, for example, above 100° C./hr, such as set at 120° C./hr, until at the top sintering temperature. The top sintering temperature depends on the composition, and can vary, for example, from 1000 to 1250° C. The dwell time on the sintering temperature can be, for example, from 2 to 10 hrs depending on the composition, the mass of sample, and the grain size target.

Figure 14:
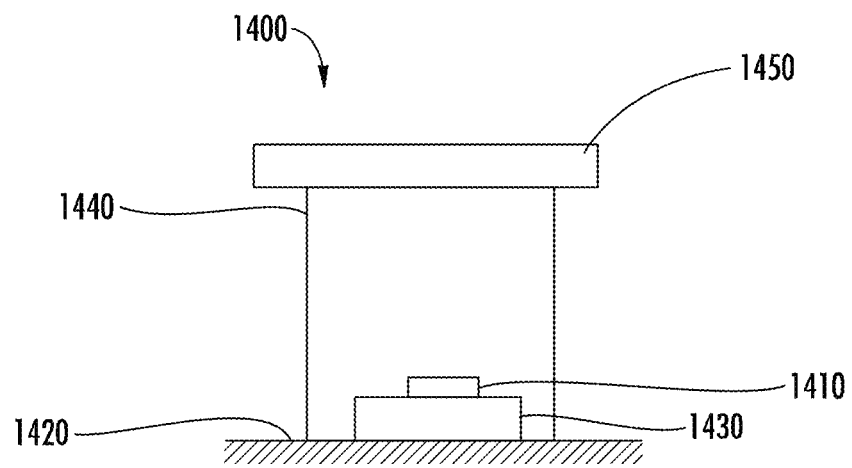
FIG. 14 shows a schematic of an exemplary sintering apparatus.
Figure 15:
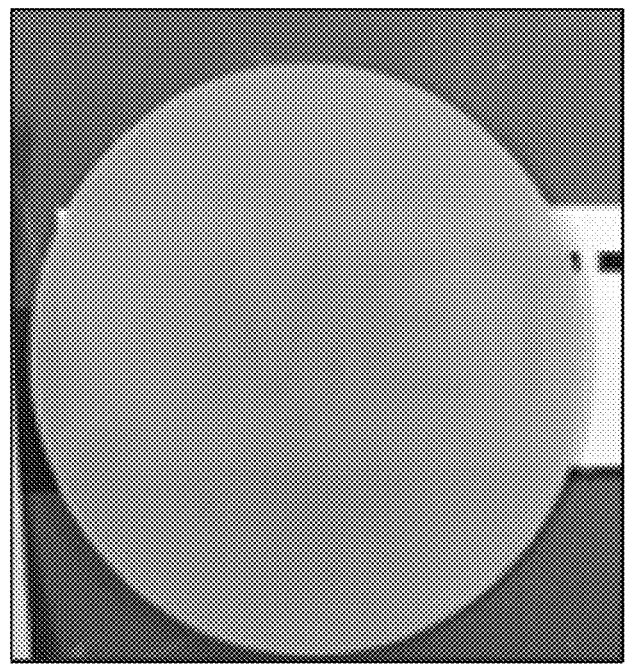
FIG. 15 shows an image of an exemplary disk shape of Ta doped garnet tape after sintering in air, illustrating its flatness, translucent appearance, and uniform color properties.

For sintering in an inert gas environment, the green tape (1410) can be placed directly on a platinum support (e.g., a plate (1420), or alternatively, on a garnet setter (1430) depending on the composition (see FIG. 14). The tape was covered by an inverted platinum crucible (1440) to reduce the loss of lithium, but the sealing does not need to be as tight as when sintering in air. The objective is to begin the firing in air to burn out the binder or other organics, usually up to 800° C. to remove all carbon, then changing to an inert atmosphere, such as Ar or $N_2$, for the remainder of the firing. The inert gas flow is preferably maintained at, for example, 40 cfph throughout the inert gas sintering phase. The top sintering temperature can be lower for samples sintered in air, and can be, for example, at least 50° C. lower than samples sintered in an inert atmosphere. The tapes sintered in an inert atmosphere (i.e., oxygen free) are also dense, translucent, hermetic, and have the same ion conductivity as tape samples sintered in air. FIG. 15 shows an example of a tape sintered in an inert atmosphere.

Example 11

Making a Lithium Garnet Setter The lithium garnet setter is an aluminum doped composition of the formula $Li_{6.1}La_3Zr_2Al_{0.3}O_{12}$. This composition has a high sintering temperature about 1240° C. in air having a lithium garnet cubic phase of over 95 wt % or 95 vol %, so this lithium garnet setter is a good firing support material for a lithium garnet tape. The setters can be made by dry press including uni-axial press at about 2000 psi and iso-press at about 8000 psi. The formed green pellet, usually 2 to 3 inches (50.8 mm to 76.2 mm) in diameter and 1 to 3 inches (25.4 mm to 76.2 mm) in height, is placed on a platinum sheet and covered by an inverted platinum crucible. The closed environment minimizes the loss of lithium during sintering. The top sintering temperature is 1230° C. for 2 to 6 hr. Since the setter is not necessary for full densification, the sintering condition can be lower with a shorter time holding. After sintering, the resulting sintered pellet can be cut into disks having a thickness from 0.5 to 5 mm for use as setters. The surface of the setter is preferably flat and smooth, and the setter area is preferably larger than the size of tape sample placed upon the setter. The setter can be repeatedly used for the disclosed low temperature garnet tape preparation.

Another suitable setter is a Ta doped garnet with a composition of the formula $Li_{6.5}La_3Zr_{1.5}Ta_{0.5}O_{12}$ including 10 wt % of $Li_2O$ added to the batch. The batch was sintered similar to the abovementioned Al doped setter and used a sintering temperature of 1250° C. for 4 hrs in a Pt crucible. In the tape sintering process, the setter serves as a flat and smooth support for garnet tape but also prevents side reactions of Pt plate with tape. The setter also provides a source of excess Li for garnet tape to compensate for possible Li loss from the tape by $Li_2O$ evaporation.

Examples 12

Garnet Tape Sintered in Air-$Li_{6.75}La_{2.8}Ga_{0.2}Zr_{1.75}Nb_{0.25}O_{12}$ The tape is formed by tape casting from an aqueous slip system. The powder is gallium and niobium bi-doped lithium garnet having stoichiometric composition of the formula $Li_{6.75}La_{2.8}Zr_{1.75}Ga_{0.2}Nb_{0.25}O_{12}$. The steps of making a slip include, for example: dispersing 15 g of lithium garnet powder (which has been air-classified with mono-modal particle size distribution and D50=0.4 microns), in 30 g DI water; stirring with a spatula for from 1 to 2 mins (Water is an excellent liquid to disperse the garnet powder. The majority of the powder or the agglomerates are rapidly dispersed.); then adding about 8 g of the aqueous soluble binder WB04B-53. Since this binder did not contain plasticizer, it takes longer to dissolve. The stirring by spatula was continued for 10 to 20 mins until all the binder is dissolved. Then the container was placed into a high speed mixer (Mazerustar mixer) for 5 mins. The mixer had vacuum and chilling capability, so the slip would not be inadvertently warmed, and reduces the potential for reaction between the garnet with other slip components. After mixing, the slip was immediately cast on a Mylar surface with a blade of 14 mil gap.

The tape was dried in air for about 20 hrs with some degree of cover, the dry tape was about 90 microns thick from a 14 mil blade, so four tapes were stacked in a parallel configuration, that means the tape top surface (face to air) and the tape bottom surface was against the Mylar. The stack was laminated at temperature 60° C. at 1000 psi for 20 mins. After lamination, a flat uniformly thin laminated sheet was produced and was ready for sintering.

The laminated sheet was placed on the lithium garnet setter mentioned in Example 11. Either an Al or a Ta doped setter can be used depending on tape composition. General guidance is to use a high temperature composition as the setter, preferably from 50 to 100° C. higher than the sintering temperature of the targeted composition. A small amount of mother powder was spread around the setter, then covered with an inverted platinum crucible. An alumina disc or plate was placed atop of platinum crucible as a weight to seal the gap between crucible and sheet at high temperature. The laminated sheet was sintered at 1075° C. for 2 hrs. Because of the organic content in the tape, the heating rate from ambient to 400° C. was set at a slow rate of 90° C./hr. After burning off the binder (i.e., removing the binder with heat), the heating rate was adjusted to 120° C./hr, and the total cycle time is less than 24 hrs, such as from 2 to 23 hrs. The resulting sintered tape appearance is shown as the overlay in FIG. 12. The resulting sintered tape was white, translucent, and hermetic (i.e., air-tight or air impermeable). This sintered tape composition had a high relative density, and excellent ion conductivity. The microstructure analysis of the tape as shown in FIG. 13A indicates that the surface of the tape was very dense, and is believed to be what is responsible for the tape being hermetic. FIG. 13B shows the polished internal surface of the tape, which did not have open pores. Instead all pores were closed. Some of the dark spots were not pores but rather were secondary phases that were Zr rich phases. FIG. 13C shows the grain size of the garnet after sintering. For this composition, there is an intermediate liquid phase that promotes the sintering and at the same time accelerates the growth of grains. Most grains are less than 5 microns, but some grains are up to 20 microns. The ion conductivity of the tape was $1.3 \times 10^{-4}$ S/cm.

Example 13

Garnet Tape Sintered in Air-$Li_{6.5}La_3Zr_{1.5}Ta_{0.5}O_{12}$ The Ta doped garnet tape is formed by tape casting from aqueous slip system. The powder is made by doping 0.5 mol equivalents tantalum into the garnet ($Li_7La_3Zr_2O_{12}$) to form a stoichiometric composition of the formula $Li_{6.5}La_3Zr_{1.5}Ta_{0.5}O_{12}$. The XRD analysis shows that the cubic phase is greater than 95 wt %. To make a slip system, 14 g garnet powder (D50 is 0.36 microns and 0.7 microns after air classification in ball milling, 0.61 microns after jet milling, respectively) was dispersed in 18 g DI water and stirred by spatula to mix well. Then 5.25 g aqueous soluble binder was added into the slip and stirred by magnet stir bar for 1 hr until all of the binder was dissolved. The binder was WB4101 (with 7% plasticizer), WB04B-53, or a mixture thereof, and the ratios of garnet/water/binder may vary. A vacuum pump was used to remove bubbles from the slip, and then the slip was placed in a vacuum Mazerustar mixer to form a homogeneous slip and further remove any bubble. After mixing, the slip was immediately casted on Mylar with a blade having, for example, a 8 to 16 mil gap. After drying, several layers of green tape can be laminated together to form a thicker tape. For a better lamination, warm iso-static press is preferred. The tape edges were cut off by laser to form a circular tape aiming to avoid edge curling and wrinkling during the tape sintering process.

A suitable sintering configuration is illustrated in FIG. 14. The laminated sheet is placed on the Ta doped garnet setter (described in the Example 11, Ta-doped with excess Li as setter), and Pt plate, and then covered with Pt crucible, with alumina weight on top to seal the gap between Pt crucible and plate at high temperature. The sintering profile was as follows: heating rate is 100° C./hr from ambient (e.g., 25° C.) to 600° C., and hold for 1 hr to remove any organic residues in the green tape, and after that the temperature continues to rise to the sintering temperature of 1200° C. at the same heating rate, and then a hold for 2 to 3 hrs to sinter the tape, finally the tape is cooled to ambient or about 25° C. with a cooling rate of 300° C./hr.

FIG. 14 shows a schematic of an exemplary sintering apparatus including a closed environment (1400) for sintering a garnet tape (1410), and can include, for example, a supporting platinum plate base sheet (1420), an inverted platinum crucible (1440), an alumina disc weight (1450) surmounting the platinum crucible. Contained within the chamber formed by the inverted platinum crucible is a garnet tape (1410) atop a setter (1430), and optionally a mother powder (1450) (not shown) surrounding or burying the garnet tape (1410).

FIG. 15 shows the tape appearance after sintering in air, and that the tape is translucent, uniform in color, and very flat. The capital letters "MET" printed on a background surface are clearly visible through the disk to a human eye and in an original photograph.

Figures 16A, 16B:
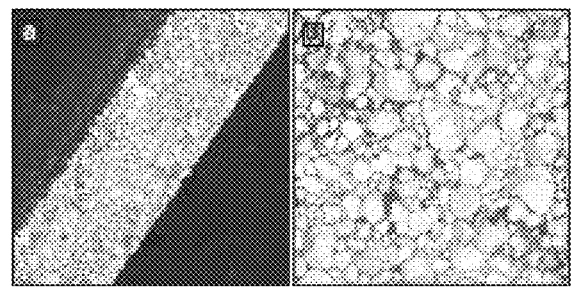
FIGS. 16A to 16D show SEM cross-section images that demonstrate that the garnet tapes are sintered dense and have small grain sizes.
Figures 16C, 16D:
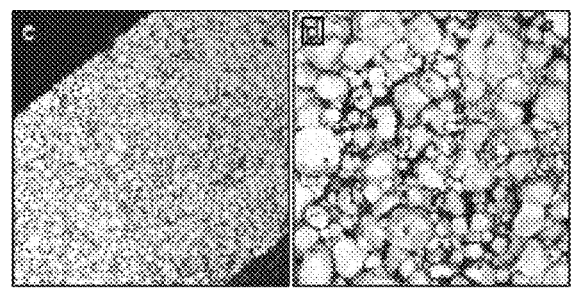

FIGS. 16A to 16D show SEM cross-section images that demonstrate that the garnet tapes are sintered dense and have small grain sizes (7 micron). FIGS. 16A to 16D illustrate the microstructure of Ta-doped garnet fractured cross sections. FIGS. 16A to 16B (scale bars are 240 and 60 microns, respectively) are SEM images for tape made from ball milled and air-classified garnet powder (0.7 microns) as shown in FIG. 11B, and using binder with plasticizer WB4101. FIGS. 16C to 16D (scale bars are 230 and 60 microns, respectively) are images for a tape made from jet milled garnet powder using binder without plasticizer WB40B-53. The image scale bars are 240 microns (FIG. 16A), 60 microns (FIG. 16B), 230 microns (FIG. 16C), and 60 microns (FIG. 16D), respectively. FIGS. 16A to 16D demonstrate that both tapes are sintered dense and have grain sizes that are quite uniform, and less than 15 microns. EDX analysis shows the presence of elements La, Zr, Ta and O (data not shown, Li not detectable by EDX), which is consistent with the garnet composition. The tapes are hermetic and they are still intact after 3 months of a methylene blue leak test. The sintered tapes have almost 100 wt % cubic phase by XRD analysis. The conductivities of tapes are high, for example, having conductivities from 2 to $3 \times 10^{-4}$ S/cm.

Example 14

Figure 17:
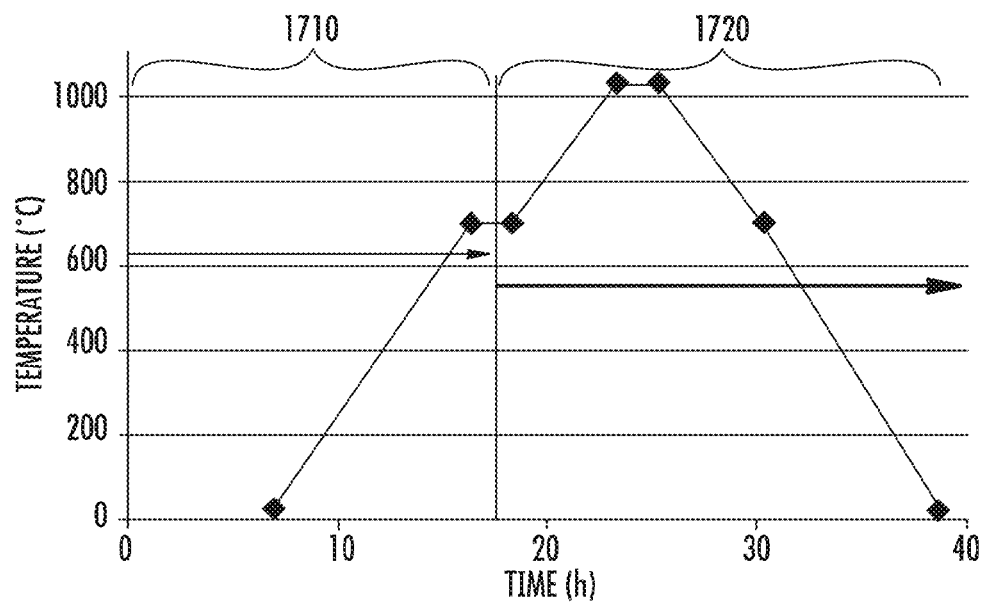
FIG. 17 is a graph of a representative sintering profile of a disclosed garnet tape.

Garnet Tape Sintered in Ar or $N_2$ Gas The lithium garnet tapes sintered in Ar or $N_2$ are very different from those sintered in air. The oxygen-free environment not only avoids the reaction between the garnet and platinum, but also lowers the sintering temperature. The tape has the same composition $Li_{6.75}La_{2.8}Zr_{1.75}Ga_{0.2}Nb_{0.25}O_{12}$. But the sintering temperature is lower than Example 13, and the tape can be sintered at as low as 1030° C., which is at least 40° C. lower. FIG. 17 shows a graph of a representative sintering profile of a disclosed garnet tape that was initially heated in a tube furnace in air atmosphere (1710) to an intermediate temperature, and then in either an Ar or $N_2$ atmosphere (1720) for the remaining part of the profile up to the final sintering temperature and in cool down to ambient.

The tapes were fired in a tube furnace, which allow control of the gas environment. The firing profile was divided into two stages: from room temperature to 800° C., the tape was fired in air to eliminate all organics; and from 800 to 1040° C. and the reminder of the firing, the tape was fired in Ar or $N_2$ environment. At 800° C., there is a two-hour holding, the gas is switched after one hour holding or at the last 30 min, to ensure the air is flowing out and the chamber is filled with Ar or $N_2$ gas before heating to a higher temperature. The sintering at 1040° C. is preferably accomplished in an oxygen-free environment. After sintering, the tapes were also translucent. Similar to the Example 2, the grains have growth that is similar to the growth level observed when sintered in air. The ion conductivity of the sintered product is consistently about $5 \times 10^{-4}$ S/cm.

Another composition $Li_{6.5}La_3Zr_{1.5}Ta_{0.5}O_{12}$ was also sintered in an Ar atmosphere. The sintering temperature was lower by at least 50° C. compared to the sintering in air. Since this composition without liquid sintering, the sintering temperature in air is equal or above 1200° C., while in Ar condition, the sintering temperature can be lowered to 1140°

C. The temperature profile is similar to FIG. 17 except the top temperature is higher. After sintering, the tape is very flat, translucent, and hermetic, but the transparency is not as good as the preceding Ar sintered example, mainly believed to be attributable to differences in the compositions. The ion conductivity was $3.2 \times 10^{-4}$ S/cm.

Example 15 (Prophetic)

Solid Electrolyte and Energy Storage Device including the Solid A full battery cell is fabricated by laminating a thin lithium metal anode to one side of the garnet solid electrolyte and printing or casting a cathode layer such as conventional lithium cobalt oxide on the opposite side. Preferably the cathode structure includes a gel electrolyte such that the electrolyte included within the cathode does not migrate. Thin metal foil current collectors are added to the electrode layers for current distribution to complete one "trilayer" structure. Multiple trilayer structures can be integrated together (i.e., combined) to increase the cell capacity if desired. With a thin solid electrolyte (20 microns thick), a thin Li metal anode (less than 10 microns thick), conventional current collectors (Al/Cu at 15 microns thick), and a lithium cobalt oxide/gel electrolyte composite at a capacity of at least 3 mAh/cm$^2$, a cell with volumetric energy density of greater than 600 Wh/L is achievable.

The disclosure has been described with reference to various specific embodiments and techniques. However, it should be understood that many variations and modifications are possible while remaining within the scope of the disclosure.

What is claimed is:

1. A composite ceramic comprising:
    a lithium garnet major phase and a grain growth inhibitor minor phase positioned between grains of the lithium garnet major phase, of the formula: $Li_{7-x}La_3(Zr_{2-x}, M_x)O_{12}$-SA, where
    M is selected from the group Al, Ga, In, Si, Ge, Sn, Sb, Bi, Sc, Y, Ti, Hf, V, Nb, Ta, W, or a mixture thereof; and
    "SA" comprises a second additive oxide, present in from 3 to 9 wt % based on the total amount of the ceramic; and x is greater than 0 and less than 1.
2. The ceramic of claim 1, wherein the ceramic has an average grain size of from 3 to 7 microns.
3. The ceramic of claim 1, wherein the ceramic has a mechanical strength of from 100 to 180 MPa.
4. The ceramic of claim 1, wherein the ceramic has an ion conductivity of from $1 \times 10^{-4}$ S/cm to $6 \times 10^{-4}$ S/cm.
5. The ceramic of claim 1, wherein the density of the ceramic is at least 95 to 98% of a theoretical maximum density of the ceramic.
6. A ceramic electrolyte comprising at least the ceramic of claim 1.
7. A method of making the composite ceramic of claim 1, comprising:
    a first mixing of inorganic source materials to form a mixture, including a lithium source compound, and other suitable inorganic source materials to make the desired garnet composition;
    a first milling of the mixture to reduce the particle size of the precursors;
    calcining the milled mixture to form a garnet oxide at from 800 to 1200° C.;
    a second mixing of the milled and calcined garnet oxide and a second additive to provide a second mixture;
    a second milling of the second mixture to reduce the particle size of constituents of the second mixture;
    compacting the second milled second mixture into a compact; and
    sintering the compact at from 600 to 1300° C.
8. The method of claim 7, wherein the lithium source compound is present in a stoichiometric excess.
9. The method of claim 7, wherein the sintering is accomplished in air, in an inert atmosphere, or first in air then in an inert atmosphere.
10. The method of claim 7, wherein the sintering is accomplished in air at from 1000 to 1300° C.
11. The method of claim 7, wherein the sintering is accomplished in an inert atmosphere at from 800 to 1200° C.
12. The method of claim 7, wherein the particle size of the first milling is from 0.3 to 4 microns and the particle size of the second milling is from 0.15 to 2 microns.
13. An electrochemical device comprising: a negative electrode; a positive electrode; and an interposed solid electrolyte material, wherein the interposed solid electrolyte material comprises the composite ceramic of claim 1 having at least one grain growth inhibitor comprising magnesia in an amount of from 3 to 9 wt. % based on the total weight of the solid electrolyte.
14. A composite ceramic comprising:
    a lithium garnet major phase and a grain growth inhibitor minor phase positioned between grains of the lithium garnet major phase,
    wherein the grain growth inhibitor minor phase is present in from 3 to 9 wt % based on the total amount of the ceramic.

* * * * *

UNITED STATES PATENT AND TRADEMARK OFFICE
CERTIFICATE OF CORRECTION

PATENT NO. : 11,749,836 B2
APPLICATION NO. : 17/682281
DATED : September 5, 2023
INVENTOR(S) : Michael Edward Badding et al.

It is certified that error appears in the above-identified patent and that said Letters Patent is hereby corrected as shown below:

On the Title Page

In Item (56), in Column 2, under "Other Publications", Line 2, delete "garnet." and insert -- garnet, --.

On the page 2, Item (56), in Column 2, under "Other Publications", Line 7, delete "Li7La3Zr2O12" and insert -- Li7La3Zr2O12 --.

On the page 2, Item (56), in Column 2, under "Other Publications", Line 10, delete "Stronitum" and insert -- Strontium --.

On the page 2, Item (56), in Column 2, under "Other Publications", Line 11, delete "Li7La3Zr2O12" and insert -- Li7La3Zr2O12 --.

On the page 2, Item (56), in Column 2, under "Other Publications", Line 17, delete ""Li7La3Zr2O12"" and insert -- "Li7La3Zr2O12" --.

On the page 2, Item (56), in Column 2, under "Other Publications", Line 21, delete "Li7La3Zr2O12"" and insert -- Li7La3Zr2O12" --.

On the page 2, Item (56), in Column 2, under "Other Publications", Line 24, delete "La3Zr2Li7O12"," and insert -- La3Zr2Li7O12"," --.

On the page 2, Item (56), in Column 2, under "Other Publications", Line 35, delete "Writien" and insert -- Written --.

On the page 2, Item (56), in Column 2, under "Other Publications", Line 40, delete "Sythesis" and insert -- Synthesis --.

On the page 2, Item (56), in Column 2, under "Other Publications", Line 49, delete "Li7La3Zr2O12" and insert -- Li7La3Zr2O12 --.

Signed and Sealed this
Twelfth Day of November, 2024

Katherine Kelly Vidal
*Director of the United States Patent and Trademark Office*

CERTIFICATE OF CORRECTION (continued)
U.S. Pat. No. 11,749,836 B2

On the page 2, Item (56), in Column 2, under "Other Publications", Line 53, delete "Li7La3Zr2012" and insert -- Li7La3Zr2O12 --.

On the page 2, Item (56), in Column 2, under "Other Publications", Line 59, delete "Li7La3Zr2012" and insert -- Li7La3Zr2O12 --.

On the page 2, Item (56), in Column 2, under "Other Publications", Line 61, delete "Li7La3Zr2012" and insert -- Li7La3Zr2O12 --.

On the page 3, Item (56), in Column 1, under "Other Publications", Line 2, delete "Al203-Added Li7La3Zr2012" and insert -- Al2O3-Added Li7La3Zr2O12 --.

On the page 3, Item (56), in Column 1, under "Other Publications", Line 5, delete "Al203 By Zr02" and insert -- Al2O3 By ZrO2 --.

On the page 3, Item (56), in Column 1, under "Other Publications", Line 13, delete "Li7La3Zr2012";" and insert -- Li7La3Zr2O12"; --.

On the page 3, Item (56), in Column 1, under "Other Publications", Line 16, delete "Li7La3Zr2012";" and insert -- Li7La3Zr2O12"; --.

On the page 3, Item (56), in Column 1, under "Other Publications", Line 17, delete "Li7La3Zr2012" and insert -- Li7La3Zr2O12 --.

On the page 3, Item (56), in Column 1, under "Other Publications", Line 18, delete "Electrochemisty" and insert -- Electrochemistry --.

On the page 3, Item (56), in Column 1, under "Other Publications", Line 24, delete "Li3B03" and insert -- Li3BO3 --.

On the page 3, Item (56), in Column 2, under "Other Publications", Line 4, delete "Li3La3Nb2012" and insert -- Li3La3Nb2O12 --.

On the page 3, Item (56), in Column 2, under "Other Publications", Line 8, delete "Li7La3Zr2012" and insert -- Li7La3Zr2O12 --.

On the page 3, Item (56), in Column 2, under "Other Publications", Line 12, delete "Li7La3Zr2012";" and insert -- Li7La3Zr2O12"; --.

On the page 3, Item (56), in Column 2, under "Other Publications", Line 14, delete "Li7-3XGaXLa3 Zr2012" and insert -- Li7-3XGaXLa3 Zr2O12 --.

On the page 3, Item (56), in Column 2, under "Other Publications", Line 18, delete "Li7-XLa3Zr2012-1/2X" and insert -- Li7-XLa3Zr2O12-1/2X --.

CERTIFICATE OF CORRECTION (continued)
U.S. Pat. No. 11,749,836 B2

On the page 3, Item (56), in Column 2, under "Other Publications", Line 22, delete ""Li7La3Zr2012"" and insert -- "Li7La3Zr2O12" --.

On the page 3, Item (56), in Column 2, under "Other Publications", Line 27, delete "Li5La3M2012" and insert -- Li5La3M2O12 --.

On the page 3, Item (56), in Column 2, under "Other Publications", Line 29, delete "gamet-type" and insert -- garnet-type --.

On the page 3, Item (56), in Column 2, under "Other Publications", Line 30, delete "effector" and insert -- effect of --.

On the page 3, Item (56), in Column 2, under "Other Publications", Line 33, delete "Li7La3Zr2012";" and insert -- Li7La3Zr2O12"; --.